United States Patent
Masi et al.

(10) Patent No.: US 10,486,144 B2
(45) Date of Patent: Nov. 26, 2019

(54) SOLID CATALYST FOR THE (CO)POLYMERISATION OF α-OLEFINS AND PROCESS FOR THE PREPARATION THEREOF

(71) Applicant: VERSALIS S.P.A., San Donato Milanese (IT)

(72) Inventors: Francesco Masi, Sant' Angelo Lodigiano (IT); Anna Sommazzi, Novara (IT); Mario Polesello, Ferrara (IT)

(73) Assignee: Versalis S.P.A., San Donato Milanese (IT)

( * ) Notice: Subject to any disclaimer, the term of this patent is extended or adjusted under 35 U.S.C. 154(b) by 0 days.

(21) Appl. No.: 15/500,647

(22) PCT Filed: Jul. 30, 2015

(86) PCT No.: PCT/EP2015/067465
§ 371 (c)(1),
(2) Date: Jan. 31, 2017

(87) PCT Pub. No.: WO2016/016355
PCT Pub. Date: Feb. 4, 2016

(65) Prior Publication Data
US 2017/0216825 A1    Aug. 3, 2017

(30) Foreign Application Priority Data

Jul. 31, 2014   (IT) .............................. MI2014A1392

(51) Int. Cl.
| | | |
|---|---|---|
| *B01J 27/138* | (2006.01) | |
| *B01J 27/135* | (2006.01) | |
| *C08F 210/16* | (2006.01) | |
| *C08F 4/655* | (2006.01) | |

(52) U.S. Cl.
CPC ........... *B01J 27/138* (2013.01); *B01J 27/135* (2013.01); *C08F 4/655* (2013.01); *C08F 210/16* (2013.01); *C08F 2410/03* (2013.01)

(58) Field of Classification Search
CPC ...... B01J 27/135; B01J 27/138; C08F 210/16; C08F 4/655
See application file for complete search history.

(56) References Cited

U.S. PATENT DOCUMENTS

| | | | | |
|---|---|---|---|---|
| 4,198,315 A | | 4/1980 | Birkelbach | |
| 4,873,300 A | * | 10/1989 | Fuentes, Jr. ............. | C08F 10/00 526/142 |
| 5,849,655 A | * | 12/1998 | Shamshoum ........... | C08F 10/00 502/125 |
| 5,973,088 A | * | 10/1999 | Jordan ................... | B01J 31/146 526/189 |
| 6,221,803 B1 | * | 4/2001 | Vereecke ................ | C08F 10/02 502/103 |
| 6,245,867 B1 | * | 6/2001 | Debras .................... | C08L 23/06 526/106 |
| 2005/0197470 A1 | * | 9/2005 | McDaniel .............. | B01J 27/053 526/64 |
| 2012/0322959 A1 | | 12/2012 | Masi et al. | |
| 2013/0137827 A1 | * | 5/2013 | Jorgensen ................ | C08F 2/34 525/240 |
| 2013/0317184 A1 | * | 11/2013 | Masi ....................... | C08F 10/02 526/113 |
| 2015/0011719 A1 | * | 1/2015 | Mariott ................... | C08F 210/16 526/123.1 |

FOREIGN PATENT DOCUMENTS

| | | |
|---|---|---|
| EP | 0146507 A1 | 6/1985 |
| EP | 0177189 A1 | 4/1986 |
| EP | 0412597 A2 | 2/1991 |
| EP | 0523785 A2 | 1/1993 |
| EP | 1171479 A1 | 1/2002 |
| WO | 00/58368 A1 | 10/2000 |
| WO | 2011060958 A1 | 5/2011 |
| WO | WO-2012084920 A1 * 6/2012 ............. C08F 10/02 |
| WO | 2016016355 A1 | 2/2016 |
| WO | 2016060958 A1 | 4/2016 |

OTHER PUBLICATIONS

International Search Report for PCT/EP2015/067465 dated Nov. 6, 2015, 8 pgs.
Y.V. Kissin, D.L. Beach J. App. Polym. Sci. 28, 1171-1182, 1984.
J.P. Machon, R. Hermant, J.P. Houzeaux, J. Polym. Sci. 52, 107 (1975).
A. Delgado Oyague, J.L. Hernandez-Vaquero Alvarez, Plastics and Rubber Processing and Applications 8, 3 (1987).
A. Schindler, Makromol. Chem. 118, 1 (1968).
H.C. Brown, H.W. Pearsall, J. Am. Chem. Soc. (1952) 74, 191.
G. Gozzelino, A. Priola, M. Sangermano, Ind. Eng. Chem. Res. (2003) 42, 5437-5439.
Encyclopedia of Polymer Science and Engineering, 2nd edition (1986), vol. 6, pp. 471-472, John Wiley & Sons Ed.
Belov, G.P. Petroleum Chemistry, vol. 34, issue 2, pp. 105-124, 1994.
G. Natta, P. Pino, G. Mazzanti, P. Longi, Gazz. Chim. It. 87, 549 & 570, (1957).
D.F. Hoeg, In the Stereochemistry of Macromolecules, vol. 1, p. 47, Marcel Dekker Inc., NY 1967.

* cited by examiner

*Primary Examiner* — Jun Li
(74) *Attorney, Agent, or Firm* — Praedcere Law

(57) ABSTRACT

An improved solid Ziegler-Natta type catalyst for the (co) polymerisation of ethylene and α-olefins, particularly in high-temperature processes, such as for example adiabatic solution processes and high-pressure adiabatic processes with elevated productivity, is provided. Said catalyst is obtained by means of an original process comprising dissolving in hydrocarbons, compounds of titanium, magnesium and optionally a metal selected from hafnium and zirconium, and reprecipitating them in two steps in succession, the first of which is chlorination and the second reduction.

10 Claims, No Drawings

SOLID CATALYST FOR THE (CO)POLYMERISATION OF α-OLEFINS AND PROCESS FOR THE PREPARATION THEREOF

The present invention relates to a solid catalyst for the (co)polymerisation of α-olefins and to a process for the preparation thereof.

More specifically, the present invention relates to an improved Ziegler-Natta type catalyst with elevated activity and thermal stability which, in combination with an appropriate cocatalyst, forms a catalytic system which is particularly effective in high-temperature polymerisation and copolymerisation processes for α-olefins, especially ethylene, for achieving high levels of industrial productivity. The present invention furthermore relates to an original process for obtaining said solid catalyst, comprising dissolving and reprecipitating compounds of titanium, magnesium and optionally a metal selected from hafnium and zirconium in a hydrocarbon liquid in the presence of chlorinating and/or reducing agents which are soluble in said hydrocarbon liquid.

It is well known that α-olefins, and in particular ethylene, may be polymerised in low-, medium- and high-pressure processes using Ziegler-Natta (ZN) type catalytic systems to yield substantially linear polymers with high molecular weights. These catalytic systems are generally composed of a catalyst based on one or more elements from the fourth to sixth group of the periodic table, in combination with a cocatalyst usually composed of an organometallic compound of aluminium, specifically a trialkylaluminium. In particular, ZN catalytic systems comprising a solid catalyst containing a transition metal (generally titanium), a divalent metal (generally magnesium), a halogen (generally chlorine), and optionally an electron-donating compound, are known.

It is also known that (co)polymerising ethylene at elevated temperatures (160-260° C.) has considerable advantages over low-temperature (50-90° C.) suspension polymerisation processes [Y. V. Kissin, D. L. Beach *J. App. Polym. Sci.* 28, 1171-1182 (1984)]: i) rapid separation of the polymer from the solvent by evaporating the latter when the pressure drops; ii) possibility of producing polymer granules immediately once the molten polymer has been removed from the reactor; iii) exploitation of the heat of reaction for maintaining the elevated temperature instead of removing it by cooling; iv) possibility of making use of reactors conventionally used for high-pressure polymerisation processes.

It is moreover known that catalysts suitable for operating under low-temperature conditions provide modest catalytic performance at elevated temperatures, in terms both of a reduction in catalytic yields and of molecular weights and it is hence not possible to make use of them alone in high-temperature processes. Furthermore, residence times in the reactor in these processes are very short (of the order of several minutes) and cannot be increased because of the short life of the catalyst due to very rapid deactivation processes under these conditions. The catalysts used must therefore achieve maximum activity extremely quickly and induction periods are not tolerable.

Furthermore, in high-temperature polymerisation processes carried out under adiabatic conditions, an elevated production capacity means reaching still higher polymerisation temperatures, as a function of quantity of ethylene converted per unit time. Such constraints entail the use of catalytic systems with extremely high thermal stability and reduced transfer reactions of the growing polymer chain, so as to be able to obtain the molecular weights which are of commercial interest at the highest possible polymerisation temperatures and consequently to maximise the hourly production capacity of the line.

Various attempts have been made to overcome some of these drawbacks, for example to improve the properties of olefin polymers or copolymers, by using what are known as "bimetallic" catalysts which are based on mixtures of two or more transition metals. For example, EP 177,189 and EP 146,507 both describe the preparation and use of ZN type catalysts based on titanium and hafnium for obtaining polyethylene with a wide (bimodal) molecular weight distribution. The process for preparing these catalysts involves introducing titanium and hafnium in two separate steps. Patent EP 523,785 reveals that the presence of carboxylate groups attached to the magnesium and transition metals makes it possible to obtain catalytic solids which are an improvement over the prior art both in terms of activity in processes for the (co)polymerisation of ethylene and other α-olefins carried out at low pressure and temperature, at high pressure and temperature and in solution, and in terms of the nature of the resultant polymers. Patent EP 1,171,479 describes one specific ZN type bimetallic catalyst supported on magnesium chloride which makes it possible to obtain high molecular weight α-olefin polymers and (co)polymers in high-temperature processes as well.

However, even for these latter catalysts, although an improvement over the prior art, it is evident a rapid deterioration in catalytic performance in terms of yield and certain properties of the resultant polymers, in particular average molecular weights, at higher temperatures (T>220° C.) and for longer residence times.

It is generally considered that the decline in performance is due both to thermal degradation, [J. P. Machon, R. Hermant, J. P. Houzeaux, *J. Polym. Sci.* 52, 107 (1975); J. A. Delgado Oyague, J. L. Hernandez-Vaquero Alvarez, *Plastics and Rubber Processing and Applications* 8, 3 (1987)], and to deactivation of the Ti(III) surface active sites brought about by the excessive alkylating power of trialkylaluminiums at elevated temperature [J. P. Machon, R. Hermant, J. P. Houzeaux, *J. Polym. Sci.* 52, 107 (1975)].

The influence of alkylaluminiums on the reduction of titanium is, however, well known [A. Schindler, *Makromol. Chem.* 118, 1 (1968); G. Natta, P. Pino, G. Mazzanti, P. Longi, *Gazz. Chim. It.* 87, 549, (1957); G. Natta, P. Pino, G. Mazzanti, P. Longi, *Gazz. Chim. It.* 87, 570, (1957)]. In particular, simultaneous alkylation of adjacent Ti(III) sites would appear to bring about a rapid reduction of Ti(III) to Ti(II) (D. F. Hoeg—in *The Stereochemistry of Macromolecules*—Vol. 1, p. 47—Marcel Dekker Inc. New York 1967). More recently, according to published application WO2011/060958, the present applicant has developed bimetallic catalysts based on titanium and hafnium carboxylate which are also capable of good performance in gas phase processes and in high pressure and temperature processes. Such catalysts, while satisfactory, have high costs and require a particularly painstaking preparation process which moreover generates large quantities of sodium chloroaluminates as by-products.

Various attempts have also been made in the past to use bimetallic ZN type catalysts based on a combination of titanium with zirconium. Such catalysts have good efficiency and lower costs than those containing hafnium, but generally do not result in polyethylenes with sufficiently high molecular weights and mechanical properties suitable for normal industrial uses.

With the aim of overcoming the above-stated drawbacks and further improving polyolefin production processes and the quality of the resultant products, the present applicant has now found that, by means of bimetallic catalysts containing hafnium and/or zirconium obtained with a specific process with two precipitation steps, it is possible to obtain appreciably better catalytic performance than in the prior art in terms of productivity and stability over time in high-temperature polymerisation processes, both in solution and at high pressure, and in particular it has proved possible to carry out such processes with excellent results by means of catalysts based on a combination of titanium and zirconium.

The present invention accordingly firstly provides a process for the preparation of a solid catalyst for the (co)polymerisation of α-olefins, comprising titanium, magnesium, aluminium, chlorine and, optionally, at least one metal M selected from hafnium and zirconium, comprising the following steps in succession:

(i) preparing a first mixture by heating in a hydrocarbon liquid medium to a temperature from 40 to 200° C., preferably from 60 to 130° C., for at least one minute, preferably for a time between 0.5 and 20 hours, at least one magnesium chloride, at least one titanium compound, at least one carboxylic acid R—COOH, wherein R is an organic group having from 2 to 30 carbon atoms, preferably from 5 to 15 carbon atoms, and, optionally, at least one compound of said metal M, in an amount such as to comply with the following ranges of atomic or molar ratios:

M/Ti=0.0-5.0; Mg/Ti=3.0-15.0; R—COOH/(Mg+M)
=1.5-8

(ii) adding to the first mixture obtained in step (i), preferably at a temperature between 10 and 70° C., a chlorinating agent selected from a silicon chloride and an aluminium chloride which are soluble in said hydrocarbon liquid medium, preferably selected from soluble complexes of aluminium trichloride having one of the following general formulae (II) or (III):

AlCl₃.OR"R'"   (II)

AlCl₃.Ar.HX   (III)

wherein:
R" and R'" each independently represent an organic group, preferably hydrocarbyl or halogenated hydrocarbyl, having from 1 to 30, preferably from 2 to 15, carbon atoms, Ar represents an optionally substituted aromatic hydrocarbon having from 6 to 20, preferably from 6 to 10 carbon atoms, and X represents a halogen atom, preferably Cl,
in a sufficient quantity to cause at least 70%, preferably at least 80%, of the magnesium and any metal M present in the solution to precipitate in the form of solid chlorides, so as to obtain a second mixture comprising a liquid phase and a solid phase;

(iii) adding to the second mixture obtained in the previous step (ii) an organometallic compound of a metal M' having the following formula (IV):

M'R""ₙCl₍ₚ₋ₙ₎   (IV)

wherein:
M' is a metal selected from trivalent aluminium, trivalent gallium, tetravalent tin or divalent zinc,
R"" is a linear or branched alkyl radical containing from 1 to 20 carbon atoms, "n" is a decimal number having a value between 0.5 and p, preferably between 1 and p, where p is the valence of M';
and reacting until at least 70%, preferably at least 80%, of the titanium present has
precipitated in the form of a solid compound to obtain said solid catalyst.

The present invention secondly provides a solid catalyst for the (co)polymerisation of α-olefins comprising titanium, magnesium, aluminium, chlorine and, optionally, at least one metal M selected from hafnium and zirconium, obtainable by means of the above-stated process.

The present invention further provides a process for the (co)polymerisation of α-olefins carried out in the presence of said solid catalyst and a suitable cocatalyst.

Further subject matter provided by the present invention will be obvious from the following description and the claims.

The term "(co)polymerisation", as used in the present description and in the claims with reference to α-olefins, is taken to mean both homopolymerisation of an α-olefin, for example of ethylene to form crystalline high-density polyethylene or of propylene to form polypropylene, and the copolymerisation of an α-olefin with at least one other unsaturated compound copolymerisable therewith in the presence of a Ziegler-Natta type catalyst, such as another α-olefin or a vinyl aromatic compound, for example, the copolymerisation of ethylene with ethylidenenorbornene to form a crosslinkable polyethylene, or the copolymerisation of ethylene with 1-butene to form linear low-density polyethylene.

Unless otherwise specified, the term "mixture", as used here in the description and the claims, is taken to mean both homogeneous mixtures, for example liquid or solid solutions, and heterogeneous mixtures such as suspensions of a particulate solid in a liquid or solid-liquid mixtures in which the solid has settled out entirely or in part.

The term "bimetallic catalysts", as used here in the description and the claims, refers to the presence in the catalyst of Ti and at least one second metal selected from Hf and Zr, or a mixture thereof.

For greater simplicity, the present description and the claims use the term "mole" and "molar ratio" both with reference to compounds composed of molecules, and with reference to atoms and ions, so not using the terms gram-atom or atomic ratio for the latter, despite these terms being scientifically more correct.

In accordance with step (i) of the process according to the present invention, the hydrocarbon liquid medium used to prepare said first mixture may be any aliphatic or aromatic hydrocarbon in the liquid state at the temperatures at which said step (i) is carried out. Aliphatic or cycloaliphatic hydrocarbons are preferred for this purpose, such as for example hexane, heptane, octane, nonane, decane, undecane, dodecane, cyclohexane, decalin or mixtures of naphthenes with a normal boiling point of between 90 and 150° C., or mixtures thereof. Depending on the maximum temperature at which the process is carried out, a person skilled in the art will be able to select a higher- or lower-boiling hydrocarbon liquid. Limited quantities of polar organic liquids such as alcohols, ethers or ketones, may be present in the first mixture of step (i), optionally derived from said metallic compounds added to the mixture, for example alcohols or ethers present in the magnesium chloride obtained according to known spray-drying methods.

Step (i) involves preparing a mixture in a hydrocarbon liquid, comprising a carboxylic acid and the compounds of the metals titanium, magnesium, and optionally hafnium and/or zirconium, present in the catalyst obtained at the end of the process. Such compounds may be selected from a wide range of known inorganic or organometallic compounds of said metals, both soluble and insoluble in the preselected hydrocarbon liquid. According to one preferred aspect of the invention, at least one of said compounds, more preferably magnesium chloride, is insoluble in said hydrocarbon liquid. All the precursor compounds of the metals which form the mixture may also be insoluble in the hydrocarbon liquid selected for step (i) of the present process. Such compounds are conveniently mixed with the hydrocarbon liquid with an overall concentration of the metals (both soluble and insoluble) of between 0.05 and 3.0, more preferably of between 0.1 and 1.0 mol/l. The order in which such compounds are introduced into the mixture with one another and with the hydrocarbon liquid is not particularly critical for the purposes of the present invention, but the carboxylic acid is preferably added last.

The compounds of titanium, magnesium, hafnium or zirconium are conveniently selected by a person skilled in the art from those which are capable of being partially or completely dissolved in the course of step (i). The compounds most suitable for the purpose may be selected on the basis of the solubility parameters for each compound, if known, or by simple preliminary solubility testing in the presence of the selected carboxylic acid. In one particularly preferred embodiment, the magnesium chloride, the titanium compound and the optional zirconium and hafnium compounds are selected from among those which are soluble in the presence of the carboxylic acid used in preparing the mixture of step (i). Non-limiting examples of suitable titanium, hafnium and zirconium compounds, both soluble and insoluble, are chlorides, bromides, alcoholates, hydrides, β-diketonates, β-acyl esters, amides, carbonates, carboxylates, phosphates, mixed compounds with said counterions and mixtures of said classes of compounds. Preferred titanium compounds are chlorides, in particular $TiCl_4$, and alcoholates, in particular titanium tetraethylate and tetrabutylate, all of which are commercially available. Preferred zirconium and hafnium compounds, when present in the catalyst, are halides, specifically tetrachlorides, and halides in combination with alcoholates. The titanium is preferably introduced into the mixture as a tetravalent ion, i.e. as a Ti(IV) compound.

Magnesium chlorides which are suitable for the present invention may be the various crystalline or amorphous forms of $MgCl_2$, preferably in powder or fine granular form (mean size <500 μm), including magnesium chlorides obtained by rapid evaporation according to known methods, for example by spray-drying, of concentrated ethanolic solutions. Other chlorides included within the scope of the present invention are mixed magnesium chlorides, in which at least one atom of chlorine is present for each atom of Mg, and the remaining counterions may be other halogens, for example Br or F, or an alcoholate group, for example ethylate, or another organic or inorganic anion.

In accordance with one procedure for carrying out step (i) of the present invention, the metallic compounds and the carboxylic acid are initially introduced, in the desired quantities, into the hydrocarbon liquid which is being stirred. The carboxylic acid is preferably introduced subsequently to the metallic compounds to facilitate control of any partial reactions already occurring during mixing. The temperature during this first mixing phase is preferably maintained at less than or equal to 40° C. Standard temperature and pressure conditions are obviously preferred to ensure greater operational simplicity of the process. However, introducing metallic compounds and the carboxylic acid into the hydrocarbon liquid which has already been adjusted to the desired temperature of between 40 and 200° C., or an intermediate temperature, is not excluded from the scope of the present invention. In one possible embodiment, specifically on an industrial scale, step (i) may be carried out continuously by feeding the metallic compounds and the carboxylic acid into a pressurised apparatus and under temperature conditions which are such as to initiate the reaction. In one particular embodiment of the present invention, one or more additional portions of carboxylic acid may be introduced into the reaction mixture at subsequent points in the course of step (i).

Any other method for mixing said compounds is, however, included within the scope of the present invention.

The molar ratios between the various metallic compounds of step (i), included within the above-stated ranges, are selected as a function of the desired atomic ratios between the corresponding elements in the solid catalyst obtained at the end of the process. Such atomic ratios are not necessarily identical to those of the metals in the corresponding compounds in step (i), it being possible, in accordance with the process of the present invention, for there to be deviations as a function of the specific conditions adopted, specifically due to small quantities of compounds which have remained undissolved at the end of step (i) or unprecipitated in step (ii) or (iii), which ratios may usually amount to 30% more or less without this significantly impairing the expected properties of the solid catalyst obtained at the end of the preparation process. A person skilled in the art is capable, during conventional preliminary process development operations, of checking the extent of such deviations and appropriately optimising the ratios of the reactants as a function of the desired atomic ratios between the elements in the finished product. Preferred atomic ratios between the elements in step (i) of the process of the present invention are as follows:

$$M/Ti=0.0\text{-}5.0;\ Mg/Ti=3.0\text{-}16.0;\ R\text{—}COOH/(Mg+M)=2.0\text{-}5.0$$

According to one particular embodiment of the present invention, no metal M is present in the mixture of step (i) (molar ratio M/Ti=0). In said case, according to the conventional definition in the field of Ziegler-Natta type catalysis, a catalyst solely based on supported titanium as the active metal will be obtained.

According to another specific embodiment of the present invention, a suitable compound of a metal M selected from hafnium and zirconium, preferably zirconium, is introduced in step (i). In the case that metal M is present, the M/Ti molar ratio is preferably between 0.2 and 5.0, more preferably between 0.5 and 4.0. In said case, a "bimetallic" catalyst will be obtained.

The carboxylic acid of the formula RCOOH used in step (i) for partially or completely dissolving the solids present therein preferably has a relatively large number of carbon atoms in the chain, between 5 and 15, to promote dissolution in a hydrocarbon type liquid medium. Carboxylic acids with having more than 31 carbon atoms are difficult to obtain commercially and do not provide any particular advantages over those having up to 31 C atoms in the chain. The group R in the formula of the carboxylic acid may be any hydrocarbon radical having up to 30 carbon atoms, including hydrocarbon radicals substituted with inert groups, specifically halogens such as fluorine and chlorine. More preferably, R is an aliphatic or cycloaliphatic radical having from 6 to 12 carbon atoms.

Non-limiting examples of said group R according to the present invention are:
- a linear alkyl containing at least 5 carbon atoms; for example the groups n-hexyl, n-octyl, n-decyl or n-undecyl;
- a branched alkyl which may be represented by the following general formula:

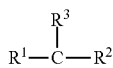

where $R^1$ is hydrogen or alkyl and $R^2$ and $R^3$ are alkyl, in which the sum of carbon atoms is equal to at least 4 and up to 12; for example the groups isoamyl, 1-ethylhexyl or branched aliphatic radicals of versatic acids;
- an alkyl bearing a branch on the secondary carbon atom in β position relative to the carbon atom of carboxy and having from 4 to 12 carbon atoms; for example 3-ethylpentanoic and citronellic acid;
- a cycloalkyl, aryl, alkylcycloalkyl or alkylaryl having the general formula:

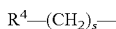

where $R^4$ represents the cycloalkyl or aryl moiety having from 5 to 10 carbon atoms, for example the cyclohexyl, benzyl, phenyl, p-ethylphenyl group and "s" is an integer ranging from 0 to 10.

Mixtures of acids having different groups R containing from 2 to 30 carbon atoms, as defined previously, are likewise included in the definition of carboxylic acid R—COOH according to the present invention.

The carboxylic acid may be added in portions or continuously to the heterogeneous mixture of step (i), or may be added all at once in the predetermined quantity. The quantity of carboxylic acid depends, in each instance, on the nature and quantity of the compounds which are insoluble in the undiluted hydrocarbon liquid and are optionally used to form the mixture of step (i), as well as on the quantity of insoluble residue which a person skilled in the art considers tolerable at the end of step (i). Said latter quantity is conveniently as small as possible, normally less than 30%, and preferably between 0 and 10%, by weight relative to the initial total insoluble weight. The molar ratio RCOOH/(Mg+M) is preferably between 2.0 and 5.0, more preferably between 2.5 and 4.0.

In general, the quantity of carboxylic acid is selected in such a manner as to obtain the greatest possible dissolution of the metallic compounds in step (i), but also as to require the use in the subsequent steps of reasonable quantities of precipitating and reducing compounds, in particular of compounds of the formula (III) in step (iii). In the course of step (i), carboxylic acid is preferably introduced in an overall molar quantity of between 1 and 3 times, more preferably between 1.5 and 2 times, the equivalents of the insoluble compounds. Thus, for example, if the mixture of step (i) contains in decane 20 mol of $MgCl_2$ and 3 mol of $HfCl_4$, both of which are insoluble, and 2 mol of titanium tetrabutylate, which is soluble, the quantity of carboxylic acid (for example versatic acid) will preferably be selected from 52 and 156 mol, more preferably between 78 and 104 mol. In the case in which the metallic compounds in step (i) are all soluble in the hydrocarbon liquid in the preselected quantities, the carboxylic acid is conveniently introduced with an RCOOH/(Mg+M) ratio of between 1.5 and 2.0.

The above-stated carboxylic acid may be added to the mixture in pure form, or diluted with an inert solvent, preferably the same hydrocarbon liquid as the mixture of step (i), for example to promote mixing if the acid is solid, or to ensure more accurate metering if small quantities are used.

Step (i) of the process of the present invention is carried out at temperatures of greater than 40° C. to promote rapid dissolution of the solids optionally present in the mixture. The maximum dissolution temperature is preferably between 60 and 130° C., more preferably between 70 and 110° C. Optional cooling of the mixture after partial or total dissolution of the insoluble compounds is among the operations of the process within the scope of step (i).

In the course of step (i), a mixture is formed in which the carboxylic acid reacts at least in part with the metallic compounds present to form mixed carboxylates in solution. The residual solid which may optionally remain undissolved at the end contains one or more of the metals initially introduced into the mixture. When the magnesium compound in step (i) is anhydrous $MgCl_2$, it has been found that said residue, if present, is substantially made up of magnesium chloride.

Step (i) is preferably carried out in such a manner that there are no significant outward losses of material, for example in a closed container, under pressure, or under solvent reflux conditions. If hydrochloric acid evolves during the reaction due to the presence of chlorides of the above-stated metals, it is thus kept in solution in the reaction mixture.

At the end of step (i), the optionally present residual solid may be appropriately separated from the liquid before the latter is treated with a soluble complex of aluminium chloride in accordance with the subsequent step (ii), in such a manner as nevertheless to obtain a first mixture made up of a solution. Separation may be carried out, preferably once the mixture has been cooled to a temperature of between 20 and 40° C., by means of any one of the known methods suitable for this purpose, such as for example filtration, decantation or centrifugation. In one preferred embodiment, optional separation of the insoluble residue is carried out in suitable closed containers while maintaining pressure and temperature at values such as to limit release of vapour to the greatest possible extent.

Obtaining a solution as the first mixture in step (i) is a preferred aspect of the present invention.

In step (ii) of the process for preparing the catalyst according to the present invention, an Al chloride or an Si chloride which are soluble in the hydrocarbon liquid is reacted with the first mixture obtained in accordance with the previously stated step (i), for the purpose of forming a second mixture of a heterogeneous nature comprising a liquid phase and a solid phase, preferably a granular precipitate. In the present applicant's experience, a suspended solid predominantly made up of chlorides of Mg and of the optionally present metal M is formed in the course of step (ii), while the titanium substantially precipitates in the course of the subsequent step (iii), predominantly in the form of $TiCl_3$. In this manner, a catalyst is obtained which has high activity and an optimum grain size, in addition to exhibiting improved stability during the polymerisation process over a wide temperature range.

Soluble Si chlorides are suitable; for step (ii) of the present process, silicon chlorides and chlorosilanes having the following formula (I):

$$Si_vCl_{(4v-m-r)}H_mR'_r \qquad (I)$$

wherein v is an integer between 1 and 4, preferably between 1 and 2, m and r are two integers such that the sum m+r is between 0 and 2v and are preferably both 0;

R' represents an organic group, preferably hydrocarbyl or halogenated hydrocarbyl, having from 1 to 30, preferably from 2 to 15, carbon atoms.

Preferred silicon chlorides are $SiCl_4$ and $SiCl_3CH_3$, both of which are commercial products. The soluble aluminium chlorides having the above-stated formulae (II) and (III) in accordance with the present invention are known classes of compounds and are readily obtainable even industrially using well known methods.

Soluble complexes of aluminium chlorides of the formula (II) may readily be prepared, for example, by direct reaction of $AlCl_3$ with an aliphatic ether in solution of a suitable hydrocarbon, preferably the same as used in the process of the present invention. Preferred compounds of the formula (II) are those in which R" and R'" are identical to one another and are aliphatic hydrocarbon groups having from 4 to 10 carbon atoms, for example n-hexyl or n-octyl.

Soluble complexes of aluminium chlorides of the formula (III) are readily obtainable by means of known methods, for example the syntheses described in published patent application EP 412597 and in the following publications:

H. C. Brown, H. W. Pearsall, J. Am. Chem. Soc. (1952) 74, 191;

G. Gozzelino, A. Priola, M. Sangermano, Ind. Eng. Chem. Res. (2003) 42, 5437-5439.

In accordance with the above, the complexes of the formula (III) are prepared by reacting, in an aliphatic or aromatic hydrocarbon liquid solvent, solid $AlCl_3$ with a hydrohalic acid, for example HCl or HBr, in the presence of an excess of an aromatic hydrocarbon, for example toluene, xylene, mesitylene or tetralin, which may also be the same reaction solvent. The reaction is carried out at room temperature by addition of the acid, for example by HCl bubbling, to the suspension of $AlCl_3$ in the hydrocarbon liquid comprising the aromatic compound.

Said step (ii) of the process according to the present invention is carried out at temperatures between 10 and 70° C., preferably between 20 and 60° C., still more preferably between 30 and 60° C. According to one particular manner of carrying out step (ii) of the process, a low temperature, for example of between 30 and 50° C., may be maintained during addition of the reactants, and the suspension may then be heated up to 50-70° C., preferably 55-65° C., to facilitate formation of a granular precipitate with a narrow particle size distribution.

The soluble Si chloride or $AlCl_3$ complex, in the form of a solution in liquid hydrocarbon, are preferably added slowly to the first liquid mixture which is being stirred, in such a manner as to permit straightforward control of the temperature within the desired limits. In a preferred embodiment, the soluble silicon chloride or $AlCl_3$ complex is added to the first mixture originating from step (i) in such a manner that the difference between the minimum temperature and the maximum temperature in the addition step does not exceed 20° C., preferably 10° C. This may be achieved by controlling the flow rate at which the soluble $AlCl_3$ complex or silicon chloride (or of a solution thereof in a hydrocarbon solvent) is added to the first mixture of step (i).

The addition time for said chlorinating reactants depends on system conditions and on the desired temperature control, and is conveniently between 10 minutes and 4 hours, preferably between 0.5 and 2 hours, without this however in any way limiting the scope of the present invention.

The soluble Si chloride or $AlCl_3$ complex (or a mixture of said compounds) is preferably added in such a quantity as to achieve virtually complete precipitation of Mg and the optionally present Zr or Hf (preferably 100% of Mg and M precipitated). Using conventional routine testing, a person skilled in the art is capable of predetermining for each specific composition of the first mixture obtained in step (i), the quantity of soluble silicon or aluminium chloride which is sufficient to cause quantitative precipitation of the metals Mg and M. On the basis of having carried out extensive experimental testing, the present applicant has found that the quantity of soluble Si or Al chloride to be reacted in step (ii) is preferably such as to introduce a quantity of moles of Cl into the reaction mixture which is at least equal to the sum of moles of carboxylic acid and moles of organic residues attached to the metals present in the preceding step (i). More preferably, said quantity of Cl is at least 1.30 times said sum of moles of carboxylic acid and moles of organic residues attached to the metals. Still more preferably, said quantity of Cl is between 1.5 and 3.0 times said sum. Quantities of Cl greater than 3 times said sum do not improve the characteristics of the desired catalyst and involve a pointless waste of reactants. Molar quantities of Cl of between 0.5 and 1 times said sum may be insufficient for complete precipitation of the chlorides of Mg and the optional metal M dissolved in step (i), although this is not detrimental to obtaining a catalyst which is nevertheless active in the (co)polymerisation of α-olefins because precipitation of any residual quantities of said metals (less than 25% of the total) may be completed in the following step (iii).

At the end of the reaction according to said step (ii), a person skilled in the art is able to check the content of ions of Mg and optional M in the liquid remaining after precipitation for forming said second mixture and, if said content is non-negligible, to decide to add a further appropriate quantity of soluble Si chloride or soluble Al complex to complete the desired precipitation.

According to step (iii) of the process according to the present invention, a reducing and optionally chlorinating organometallic compound having the formula (IV), preferably an alkylaluminium chloride or a trialkylaluminium, is reacted with said second mixture to reduce and precipitate the titanium, such that the latter is present in the solid catalyst obtained at the end of the process predominantly in oxidation state +3, i.e. in the form of titanium trichloride. As is known, alkyls and alkyl halides of Al, Ga, Sn and Zn, in particular of Al, all have reducing agent properties. A person skilled in the art may thus choose from a wide range of compounds falling within the previously stated formula (IV), such as, for example, ethyl zinc chloride, dibutylzinc, dibutyltin dichloride, and in particular aluminium compounds.

Alkylaluminium chlorides included in formula (IV) with M' equal to Al are known and widely used in the field of preparing catalysts for the polymerisation of α-olefins. Preferred alkylaluminium chlorides are the compounds of the formula (IV) in which M' is Al and R' is a linear or branched aliphatic radical having from 2 to 8 carbon atoms. In this case, the subscript "n" in formula (IV) is preferably between 0.9 and 2.1, more preferably between 1 and 2, including the extremes. Typical examples of such compounds are ethylaluminium dichloride, diethylaluminium chloride, ethylaluminium sesquichloride, isobutylaluminium dichloride or dioctylaluminium chloride. Alkylaluminium chlorides having decimal, non-integer values of "n" may be obtained, according to the prior art, by mixing appropriate proportions of aluminium chlorides and trialkylaluminiums and/or the respective mixed alkyl chlorides having "n" equal to 1 and 2.

Suitable trialkylaluminiums included in the previously stated formula (IV) are for example, triethylaluminium, triisobutylaluminium and tri-n-butylaluminium.

The reducing or reducing/chlorinating compound of the formula (IV), in particular an alkylaluminium chloride or a trialkylaluminium, may be added undiluted, or, preferably, in the form of a solution in an inert organic solvent selected from those used for preparing the first mixture in step (i). The compound of the formula (IV) may be added by stirring the reaction mixture while maintaining suitable temperature conditions by thermostatic control. The quantity of compound of the formula (IV) which is sufficient to bring about quantitative precipitation of the titanium in step (iii) of the process of the present invention is preferably between 1.5 and 20 times, more preferably between 2 and 15 times, still more preferably between 2 and 10 times, or indeed between 3 and 6 times the moles of titanium present in the liquid phase of the second mixture obtained at the end of step (ii).

Larger quantities of compound of the formula (IV), in particular alkylaluminium chloride or trialkylaluminium, do not further improve the characteristics of the catalyst, but involve excessive consumption of metal M' and subsequently make repeated washing of the precipitate necessary.

Step (iii), during addition of the compound of the formula (IV) to said second mixture, is performed at a temperature of 20 to 60° C., more preferably between 30 and 45° C., for a time which, depending on the preselected temperature and type of apparatus, may vary from 10 minutes to 4 hours, preferably from 0.5 to 2 hours.

According to step (iii) of the preparation process, subsequently to the addition of the alkylaluminium chloride, the resultant suspension is preferably heated to and maintained at a temperature of 50 to 130° C., more preferably of 60 to 100° C., for a time of 5 to 180 minutes, preferably from 40 to 150 minutes, to complete reduction and chlorination of the titanium and consolidate the resultant solid. Preferably, the heating and temperature maintenance phase of step (iii) is carried out in a closed and stirred container, at the equilibrium pressure reached by the system, which is usually between 100 and 500 kPa.

Using the above-stated conditions, the catalyst according to the present invention is obtained in the form of a granular or pulverulent solid precipitate. The solid preferably assumes the form of a particulate product with particles typically having a relatively narrow Gaussian distribution with an average diameter of between 2 and 15 μm, preferably between 3 and 12 μm and a particle size distribution having 80% of the particles within a range from 1 to 30 μm, preferably between 2 and 20 μm. This is a further advantageous aspect of the process for preparation of the catalyst of the present invention because it is consequently possible to obtain a catalyst at the end of step (iii) with an average granule size and distribution which are ideal for optimal separation from the mother liquors and subsequent washing, as well as for carrying out subsequent operations, transport and storage of the resultant solids.

According to a preferred embodiment of the present invention, the resultant solid catalyst is conventionally separated from the reaction liquid (containing alkylmetal residues, carboxylates and other by-products) using ordinary liquid-solid separation means other than solvent evaporation. Decantation, filtration or centrifugation, or a combination of such methods are typically used, with intermediate washing operations preferably being carried out with a hydrocarbon solvent until the separated liquid has a content of metal M', particularly aluminium, of less than 1.5 mM/l, more preferably 1 mM/l.

The catalyst obtained at the end of step (iii) is a granular solid which is active in the (co)polymerisation of α-olefins in combination with a cocatalyst usually composed of a trialkylaluminium, according to the prior art, and is thus also provided by the present invention.

Said solid catalyst for the (co)polymerisation of α-olefins comprises titanium, magnesium, optionally a metal M selected from hafnium and zirconium, preferably zirconium, chlorine, and a metal M', preferably aluminium, in the following molar ratio ranges:

$$M/Ti=0.0\text{-}4.0;\ Mg/Ti=3.0\text{-}15.0;\ M'/Ti=0.1\text{-}3.0;\\ Cl/Ti=15.0\text{-}50.0;\ (RCOO\text{---})/Ti=0.05\text{-}2,$$

where M, R and M' have the meanings specified above and RCOO— denotes the carboxylate present in the solid.

In one particular embodiment, said catalyst is a bimetallic catalyst in which the M/Ti ratio is between 0.5 and 4.0.

In a further preferred embodiment of the present invention, the solid catalyst obtained at the end of said process has the following (atomic or molar) composition ratios:

$$M/Ti=0.5\text{-}4.0;\ Mg/Ti=6.0\text{-}13.0;\ Al/Ti=0.2\text{-}2.0;\\ Cl/Ti=18.0\text{-}40.0;\ (RCOO\text{---})/Ti=0.1\text{-}1.2$$

Said catalyst is preferably characterised in that at least 70%, preferably at least 90%, of the titanium is in oxidation state +3 and has a particle size with a narrow Gaussian distribution having a maximum between 2 and 15 μm, preferably from 3 to 12 μm and dimensions of the granules such that 80% by weight thereof is in a range from 1 to 30 μm, preferably between 2 and 20 μm. The density of said catalyst, measured using a Pascal porosimeter, is preferably greater than 1.8 g/cm³, more preferably between 2.0 and 3.0 g/cm³.

Typically, up to 15%, preferably up to 10%, more preferably from 1 to 5%, by weight of the catalyst is composed of an organic residue containing the carboxylate ion. Impurities, normally below 0.5% by weight, derived from the counterions of the compounds used as reactants may furthermore be present, for example alcoholates, bromide, fluoride, phosphate groups, alkyl residues, without this resulting in any particular disadvantage. Catalysts having the smallest possible quantity of impurities of other metals, particularly no greater than 0.1% by weight, are nevertheless preferable.

The quantity of titanium present in the catalyst of the present invention preferably does not exceed 10% by weight, more preferably is between 1 and 5% by weight. Titanium contents in excess of 10% by weight offer no further advantage in terms of catalyst activity, presumably because the further titanium is present in the solid in a form which is inactive or unavailable for interaction with the olefin to be polymerised.

Said catalyst may be obtained, at the end of the above-stated step (iii), in dry granular form, and optionally stored under an inert atmosphere for subsequent use, or, preferably, is obtained in the form of a concentrated suspension (slurry) in a hydrocarbon solvent, preferably the same solvent as used in the final washing, at the end of the decantation separation process, and stored in this form for use in the α-olefin polymerisation process. The catalyst of the present invention, when in the form of a "slurry", conveniently has concentrations of between 150 and 500 g/l, suspended in aliphatic hydrocarbons having a number of carbon atoms of between 6 and 14, preferably between 8 and 12. The improved morphology and greater density of the precursor obtained under the preferred controlled temperature conditions of step (iii) make it possible to prepare said concentrated suspensions by decantation in times of a few hours.

According to another embodiment of the present invention, the catalyst obtained at the end of step (iii) may also be directly kept in the form of a mixture or suspension in a liquid comprising at least some, preferably up to 80%, more preferably from 5 to 40%, of the reaction liquid, with a concentration preferably of between 150 and 500 g/l, by separating the remainder of said reaction liquid in accordance with known methods, preferably by decantation, and be used as such in α-olefin (co)polymerisation processes. Catalysts of the present invention obtained in said form are particularly suitable for the production of high molecular weight ethylene polymers by high-temperature polymerisation processes.

All the previously described processing operations, in particular those associated with steps (ii) and (iii), are conveniently carried out under a controlled, inert atmosphere, for example of nitrogen or argon, given the reactivity of the reactants used, in particular the alkylaluminiums, and of the catalytic solid with regard to air and moisture.

The catalyst obtained at the end of the process according to the present invention may be brought into contact with a cocatalyst selected from hydrides or organometallic compounds of metals of groups 1, 2 or 13 of the periodic table, using known techniques for preparing Ziegler-Natta type polymerisation catalysts, in order to obtain a catalytic system for the (co)polymerisation of α-olefins, and in particular ethylene, having high activity and selectivity, as well as an extended service life in processes carried out at elevated temperatures.

The present applicant has found that these new catalysts are characterised by a different surface distribution of the active metals, such as titanium and, if present, hafnium or zirconium, in comparison with similar prior art catalysts, and they make it possible to achieve very much higher yields right from the first moments of polymerisation in (co)polymerisation processes carried out at temperatures between 130 and 260° C., apart from providing high productivity thanks to their greater endurance (i.e. longer deactivation times) in polymerisation reactions at elevated temperature.

Suitable cocatalysts which are usable in combination with the catalyst of the present invention in α-olefin (co)polymerisation processes are those normally described in the art and which have previously been mentioned for the preparation of Ziegler-Natta type catalysts. Preferred cocatalysts are trialkylaluminiums and alkylaluminium halides (specifically chlorides) containing from 1 to 10, preferably from 2 to 6, carbon atoms in each alkyl radical attached to Al. Among these, those which are particularly preferred are trialkylaluminiums, such as triethylaluminium, tri-n-butylaluminium, triisobutylaluminium and trihexylaluminium.

In the catalytic systems of the present invention, the atomic ratios between aluminium (in the cocatalyst) and titanium (in the catalyst) is generally in the range from 3:1 to 500:1, preferably from 10:1 to 200:1, more preferably from 15:1 to 100:1 as a function of the type of cocatalyst and the particular polymerisation process selected.

Said (co)polymerisation catalytic system is formed according to known methods, by contact between the solid catalyst and the cocatalyst, for example in a suitable liquid medium, usually a hydrocarbon, which may also be composed of, or may contain, one or more of the olefins to be polymerised. Depending on the characteristics of the polymerisation process in which it is desired to use the catalyst obtained according to the present invention, the catalyst/cocatalyst catalytic system may prepared separately and subsequently introduced in the polymerisation reactor, or may be prepared in situ by feeding the components separately into the reactor. The temperature at which said components are brought into contact to form the catalytic system is not particularly critical and may vary over a wide range, preferably in the range from 0° C. to the service temperature in the polymerisation process. The catalytic system is usually formed virtually immediately even at room temperature, although contact between the components may in certain cases be maintained for 10 seconds to 30 minutes, depending on the temperature, before polymerisation is initiated.

One or more additives or further components may optionally be added to the above-stated catalyst according to the present invention by analogy with prior art knowledge in order to obtain a catalytic system suitable for meeting specific, practical requirements. The resultant catalytic systems should be considered to be included in the scope of the present invention. Additives or components which may be included in the preparation and/or in the formulation of the catalyst of the present invention are inert liquids, such as for example aliphatic and/or aromatic hydrocarbons, which are suitable for keeping the catalyst in suspension, as well as small quantities of weakly coordinating additives (Lewis bases) selected, for example, from non-polymerisable olefins, ethers, tertiary amines and alcohols, other halogenating agents such as halogenated, preferably chlorinated, hydrocarbons, and furthermore any other optional components normally used in the prior art for preparing conventional catalysts for the (co)polymerisation of ethylene and other α-olefins.

The above-described catalyst may advantageously be used in any known α-olefin (co)polymerisation processes, whether continuous or batchwise, in one or more steps, such as, for example, low pressure (0.1-1.0 MPa), medium pressure (1.0-10 MPa) or high pressure (10-150 MPa) processes, at temperatures between 20 and 300° C., optionally in the presence of an inert diluent. Hydrogen may conveniently be used as molecular weight regulator.

Said processes may be carried out in solution or suspension in a liquid diluent normally composed of saturated aliphatic or cycloaliphatic hydrocarbons having from 3 to 12, preferably from 6 to 10, carbon atoms, but which may also be composed of a monomer, such as for example, in the known process for copolymerising ethylene and propylene in liquid propylene. The quantity of catalyst introduced into the polymerisation mixture is preferably selected such that the concentration of titanium is between $10^{-4}$ and $10^{-8}$ mol/liter.

Alternatively, polymerisation may be carried out in the gas phase, for example in a fluidised bed reactor, normally at pressures of 0.5 to 5 MPa and temperatures of 50 to 200° C.

α-Olefins which may be used in the above-stated processes are preferably those aliphatic, cycloaliphatic or aromatic α-olefins which contain from 2 to 20, more preferably from 2 to 8, carbon atoms such as ethylene, propylene, 1-butene, 4-methylpent-1-ene, 1-hexene and 1-octene, ethylidenenorbornene or styrene. Ethylene is particularly preferred, with reference both to homopolymerisation processes and copolymerisation processes in which ethylene is nevertheless the predominant monomer because it constitutes more than 50% by weight of the resultant polymer.

In particular, the catalyst of the present invention may be used in the preparation of polymers and copolymers of ethylene with a molecular weight distribution which is surprisingly narrow in comparison with that normally obtained in polymerisation processes with bimetallic catalysts. Said catalyst may be used with excellent results in the polymerisation of ethylene to yield linear polyethylene and in the copolymerisation of ethylene with propylene or higher α-olefins, preferably having from 4 to 10 carbon atoms, to yield copolymers having various characteristics as a function of the specific polymerisation conditions and of the quantity and structure of the α-olefin itself. Linear polyethylenes with a density of between 0.880 and 0.950 and with an average molecular weight of between 100,000 and 2,000,000 may, for example, be obtained. The α-olefins preferably used as comonomers with ethylene in the production of linear low- or medium-density polyethylene (known by the abbreviations ULDPE, VLDPE and LLDPE depending on density) are 1-butene, 1-hexene and 1-octene.

The catalyst of the present invention may also conveniently be used in processes for copolymerising ethylene and propylene to yield saturated peroxide-vulcanisable elastomeric copolymers which are highly resistant to ageing and degradation, or in the terpolymerisation of ethylene, propylene and a non-conjugated diene having from 5 to 20 carbon atoms, to obtain EPDM type vulcanisable rubbers.

Examples of non-conjugated dienes typically used for preparing these copolymers are 5-ethylidene-2-norbornene (ENB), 1,4-hexadiene and 1,6-octadiene.

The solid catalyst of the present invention is particularly advantageously used in α-olefin (co)polymerisation processes, and specifically ethylene, in solution at elevated temperature. Said processes are normally carried out at temperatures of between 130 and 300° C., preferably between 160 and 230° C., and a pressure between 1 and 25 MPa, preferably between 5 and 20 MPa, in the presence of an inert liquid capable of keeping the polymer formed in solution at the process temperature. In this manner, a homogeneous reaction mixture (with the exception of the catalyst) and a readily controllable, flexible process which permits short residence times and high productivity are obtained. Liquids which are preferred both for their polyolefin solvating characteristics and for their relatively low toxicity are aliphatic or cycloaliphatic hydrocarbons having from 6 to 10 carbon atoms, such as heptane, decane, cyclohexane and decalin. The polymer is then separated by precipitation or by solvent devolatilisation. General information about known processes of this type may be obtained by making reference, among the numerous publications which are available, to "Encyclopedia of Polymer Science and Engineering", 2nd edition (1986), volume 6, pp. 471-472, John Wiley & Sons Ed.

Since polyolefins, in particular when semicrystalline, are sparingly soluble in solvents, the use of relatively high temperatures, preferably between 150 and 250° C., is critical when carrying out such processes. The processes are carried out in adiabatic, or isothermal, reactors depending on the technology selected. It is, however, known in polymerisation processes performed at such high temperatures that the average molecular weight of the resultant polymer falls significantly until melt flow index (MFI) values are obtained which are so high as to be unacceptable for conventional processing methods. The catalysts normally used in solution processes are based on vanadium. These catalysts are, however, incapable of producing polyolefins with molecular weights which are satisfactory for a wide range of applications, so limiting widespread application of the process itself, despite the above-stated advantages. Furthermore, there is also scope for further improvements in relation to the activity of such catalysts. Moreover, known Ziegler-Natta type catalysts based on titanium, which are normally used in suspension processes, are also less suitable than the preceding ones when used at elevated temperature, giving rise to polyethylenes with particularly low molecular weights which are unsuitable for a many normal applications.

Unexpectedly, the catalyst according to the present invention makes it possible to obtain high average molecular weights of ethylenic polymers and copolymers, even when the above-stated elevated temperatures are used, with MFI values being obtained which are substantially lower (by as much as one order of magnitude) in comparison with conventional catalysts used under the same process conditions. In this respect, it has been found that high productivity ethylene polymerisation processes carried out with such a catalyst at temperatures of above 180° C. have made it possible to obtain polymers with a melt flow index (MFI at 2.16 kg) of less than 0.5 dg/min.

It has furthermore been found that the preparation process provided by the present invention surprisingly makes it possible to obtain bimetallic catalysts based on titanium and zirconium which are capable of performing better in ethylene (co)polymerisation processes than prior art bimetallic catalysts, and sometimes even better than the catalysts of the present invention based on a combination of titanium and hafnium. In particular, the use of zirconium in association with the use of the $AlCl_3$.xylene.HCl complex in the preparation of bimetallic titanium/zirconium catalytic systems, should be considered to be the preferable catalytic system for use in high-temperature adiabatic processes, because it makes it possible to obtain lower melt flow index values (higher molecular weights) at polymerisation temperature of above 190° C. under adiabatic conditions. It is thus clear that the new process according to the present invention makes it possible to obtain catalysts, in particular those containing zirconium, which have not previously been disclosed in the art.

Furthermore, it has been found that is possible to prepare the new catalysts using appreciably smaller quantities of chlorinating and/or reducing agents in comparison with hitherto known methods, without there being any need to separate substantial quantities of chlorination and/or reduction by-products (catalyst washing) and, consequently, involving greatly reduced production of the sludges derived from subsequent neutralisation of the excess alkylmetals or alkyl chlorides, in particular alkylaluminium chlorides.

Given the greater chlorinating efficiency of the claimed chlorinating compounds, the derived catalysts produce homo- and copolymers of ethylene, in high-temperature polymerisation processes, having higher molecular weights (lower MFI values) at identical polymerisation temperature (≥220° C.), so making it possible to increase the hourly output of polyethylene, at an identical achievable melt flow index, in adiabatic processes.

Said greater chlorinating effect furthermore makes it possible to obtain bimetallic catalytic systems containing titanium and zirconium which are capable of operating under the described conditions with similar or even better results in comparison with titanium/hafnium systems.

It is indeed known (see "Oligomerization of olefins under the action of zirconium-containing catalysts" Belov, G. P. Petroleum Chemistry, Vol. 34, issue 2, pages 105-124, 1994) that catalysts based on titanium and zirconium tend to produce low molecular weight oligomers or polymers in ethylene polymerisation processes, contrary to the situation known for hafnium.

In contrast, the process according to the present invention surprisingly makes it possible to obtain bimetallic catalysts exclusively containing titanium and zirconium such as catalytically active metals which solve the problem of producing unwanted ethylene oligomers.

The numerous aspects of the present invention are explained in greater detail in the following examples which are provided purely by way of illustration without this being capable of limiting or being considered in any way a limitation of the overall scope of the present invention.

EXAMPLES

Reactants and Materials

The following list shows the reactants and materials used in the subsequent examples of the invention and any optional pretreatments; manufacturers are indicated in brackets.

- Milli-Q water (Millipore): purity to standard ISO® 3696, type 1
- n-Hexane (Carlo Erba, RPE): dried by distillation over NaH
- Diethylaluminium chloride (DEAC) (Chemtura, pure): used undiluted
- Triethylaluminium (TEA) (Akzo Nobel, pure): used undiluted
- Triisobutylaluminium (TIBA) (Akzo Nobel, pure): used undiluted
- n-Decane: pure, ≥95%, (Synthesis-Parma), treated on 4 Å and 10 Å molecular sieves from Grace.
- 1-Hexene: 97% (Aldrich) distilled over calcium hydride
- Ethylene: (Rivoira) Grade 3.5, purity ≥99.95%
- Anhydrous magnesium chloride (Cezus-Areva): >99%, grade T.202, used undiluted
- Titanium tetra-n-butylate [Ti(Bu"O)$_4$] (TNBT Tyzor): Dorf Ketal, purity >98%
- Hafnium tetrachloride (Cezus-Areva): >99%, used undiluted
- Zirconium tetrachloride (Cezus-Areva): >99%, used undiluted
- 2-Ethylhexanoic acid (2-EHA): (Gamma Chimica) dried for treatment with 4 Å molecular sieves
- Aluminium trichloride (99% anhydrous crystals, Fluka)
- Hydrochloric acid (99.9% gaseous, Rivoira)
- Dioctyl ether (Aldrich 99%)
- Toluene, xylene, mesitylene (Aldrich) >99% dried by passage over a battery of 4 Å and 10 Å molecular sieves.

Elemental Analysis a) Determination of Mg, Al, Hf, Zr and Ti.

The quantity by weight of the metals Mg, Al, Hf, Zr and Ti in the precursors and solid catalysts of the present invention was determined, working in a dry box under a stream of nitrogen, by placing an accurately weighed aliquot of approx. 30-50 mg of sample in an approx. 30 ml platinum crucible together with a mixture of 1 ml of 40% HF, 0.25 ml of 96% $H_2SO_4$ and 1 ml of 70% $HNO_3$. The crucible was then heated on a plate, increasing the temperature until white sulfuric fumes appeared (approx. 200° C.). The resultant mixture was cooled to room temperature, 1 ml of 70% $HNO_3$ was added and then heated again until fumes appeared. Once the sequence had been repeated twice, a clear, almost colourless solution was obtained. 1 ml of $HNO_3$ and approx. 15 ml of water were then added cold and the temperature was raised to 80° C. for approx. 30 minutes. The sample prepared in this matter was diluted with MilliQ purity water to an accurately weighed weight of approx. 50 g, in order to obtain a solution on which an instrumental analytical determination was performed by means of a Thermo Optek IRIS Advantage Duo ICP-OES spectrometer (plasma with optical detection) by comparison with solutions of known concentration. For this purpose, a calibration curve in the range from 0-10 ppm was prepared for each analyte by measuring solutions of known content obtained by weight dilution of certified solutions.

The solution of the sample prepared as above was again weight-diluted in such a manner as to obtain concentrations close to the reference concentrations prior to carrying out spectrophotometric detection. All samples were prepared in duplicate. The results were considered acceptable if the individual results of the duplicate tests differed by no more than 2% relative with respect to the mean value thereof.

b) Determination of Chlorine

A quantity of approx. 30-50 mg of the sample for analysis was transferred and accurately weighed into a 100 ml glass beaker which had been tared, working in a dry box under a stream of nitrogen. 2 g of $Na_2CO_3$ were added and then, outside the dry box, 50 ml of MilliQ water. The mixture was brought to the boil and stirred with a magnetic stirrer for approx. 30 minutes. After cooling, $H_2SO_4$ diluted 1/5 was added until an acidic reaction was obtained and titration was performed with 0.1 N $AgNO_3$ with a potentiometric titrator.

c) Method for Quantitative Determination of Carboxylate

Quantitative determination of the organic carboxylate residue (in 2-ethylhexanoate examples) present in the catalyst was performed by a method developed by the present applicant and based FTIR spectroscopy measurements. An accurately weighed quantity of approx. 10 mg of solid catalyst was treated for 30 minutes at ambient temperature with approx. 10 ml of 5% HCl in water. The resultant suspension was extracted three times with a total of 20 ml of decane. The organic solution, adjusted to a volume of 30 ml, was analysed by transmission, subtracting the bands associated with decane. Quantitative IR determination of the carboxylate was carried out on the basis of a calibration curve obtained with solutions diluted to a known concentration of carboxylic acid by measuring the integrated area of the carbonyl bands from 1650 to 1775 $cm^{-1}$. The measurement of the overall integrated intensity of the bands, on the basis of the calibration curve, was used to determine the molar concentrations of the carboxylic acid (2-ethylhexanoic acid in the examples) and, the volumes being known, also the total quantities. The liquid phases (organic and aqueous) were analysed by transmission using a stationary cuvette of a thickness equal to 0.0035 cm with $CaF_2$ windows, a material which is sufficiently inert to hydrolysis and/or acid attack by the solutions in question. The spectra were acquired with Nicolet Nexus FTIR spectrophotometer in the range from 4000-1000 $cm^{-1}$ with 64 scans and a resolution of 2 $cm^{-1}$. The spectrum for pure decane was subtracted from the organic phase spectrum in order to reveal the 2-EHA bands more clearly.

The spectrum of the corresponding aqueous phase was in each case recorded, the absence of 2-EHA always being checked. Furthermore, in order to check that there is no partition of the 2-ethylhexanoic acid between the two phases, a blank test was also performed by treating a solution with a known content of 2-EHA in n-decane with acidic water and acquiring the spectra of both the initial solution and the final two phases (organic and aqueous). In confirmation of what had been assumed, no bands attributable to organic species were identified in the aqueous phase spectrum and the 2-EHA was recovered quantitatively in the organic phase.

All the operations associated with the preparation of the samples for analysis were carried out under a nitrogen atmosphere, taking those precautions which are necessary to avoid or at least minimise oxidation and/or hydrolysis phenomena.

The result of the analysis is stated formally in the examples as carboxylic acid (i.e. 2-EHA) content, although it may be considered that the acid is predominantly or completely bound as carboxylate in the catalyst.

Grain Size Analysis

The distribution and mean of the particle sizes of the catalytic solid were determined with an optical method using a series 2600 MALVERN Particle Sizer instrument with a 63 mm focusing lens and optical pathlength of the cell of 2 mm.

Characterisation of Polymers and Copolymers

The content of monomer units derived from 1-hexene in the ethylene/1-hexene copolymers was determined on samples in film form using the Nicolet Nexus FTIR spectrometer mentioned in a previous paragraph by measuring absorption of the bands at 4390 and 4255 cm$^{-1}$ and on the basis of calibration curve obtained with copolymers of a known composition.

The melt flow index (MFI) of the polymers was measured according to standard ASTM D-1238E, with weight of 2.16 kg.

The density of the resultant polymeric products was measured by means of a gradient column in accordance with method ASTM D1505-68.

Preparative Example A: AlCl$_3$.Dioctyl Ether (1:1) Complex in n-decane 18.6 g of aluminium trichloride (139 mmol) and 48 ml of anhydrous n-decane were introduced into a glass flask which had previously been subjected to 3 vacuum/inert gas cycles. Once the suspension had been cooled with a water and ice bath, the anhydrous dioctyl ether (33.82 g, 139 mmol, 42 ml) was introduced dropwise with stirring. The aluminium trichloride passed slowly into solution. The mixture was allowed to return to room temperature to obtain a solution of a light yellowish colour.

Elemental analysis of the solution: Cl: 17.9%; Al: 4.3%. [Al]=1.54 mmol/ml
FT-IR (Nujol): 938 cm$^{-1}$ ($v_{Al-OR}$).

Preparative Example B: AlCl$_3$.Dioctyl Ether (1:2) Complex in n-decane 20 g of aluminium trichloride (150 mmol) and 23 ml of anhydrous n-decane were introduced into a glass flask which had previously been subjected to 3 vacuum/inert gas cycles. Once the suspension had been cooled with a water and ice bath, the anhydrous dioctyl ether (72.7 g, 300 mmol, 91 ml) was introduced dropwise with stirring. The aluminium trichloride passed slowly into solution. The mixture was allowed to return to room temperature to obtain a solution of a light yellowish colour.

Elemental analysis of the solution: Cl: 15.9%; Al: 3.7%. [Al]=1.32 mmol/ml

The solvent was removed from an aliquot of the solution by vacuum evaporation to obtain an oil which was characterised by elemental analysis and FT-IR and $^1$H-NMR spectroscopy, confirming that the desired compound had been obtained.

Elemental analysis of the complex: (MW=618.23) [found (theoretical)] Cl: 17.3% (17.20); Al: 4.26% (4.36).
FT-IR (Nujol): 938 cm$^{-1}$ ($v_{Al-OR}$).

Preparative Example C: AlCl$_3$.Xylene.HCl Complex

Following the procedures set out in Example 1 of the cited patent application EP 412597, the complex of AlCl$_3$ with hydrochloric acid and xylene was prepared by bubbling anhydrous hydrochloric acid (gas) into a suspension of anhydrous AlCl$_3$ (51 g, 382 mmol) and anhydrous xylene (42.6 g, 401 mmol, 50 ml) until the aluminium trichloride had dissolved in the xylene, and leaving the mixture to react for three hours. A homogeneous oil of a brown-orange colour was obtained which was found to have the following composition: AlCl$_3$ (51% wt./wt.), xylene (42.6% wt./wt.), HCl (6.4% wt./wt.), as determined on the basis of the above-stated elemental analysis methods and taking account of the organic proportion exclusively formed by xylene. The concentration of Al in the solution was equal to 6.75 mmol of AlCl$_3$ per ml.

Preparative Example 1: Monometallic Mg/Ti Precursor 280 ml of n-decane and 17.57 g (184.5 mmol) of magnesium chloride were introduced in succession under a blanket of anhydrous nitrogen into a stirred, jacketed glass reactor of a volume of 1 liter. Stirring was continued for 10 minutes to homogenise the mixture and 5.785 g (17 mmol) of titanium tetrabutylate and 72.49 g (502.7 mmol) of 2-ethylhexanoic acid were added. The nitrogen pressure was adjusted to 5 kPag at room temperature and the reactor was then sealed. Keeping the reactor sealed, the mixture was heated to 90° C. and maintained at this temperature for 2 hours with stirring. The pressure rose to 121 kPag.

A clear solution was obtained which became slightly opalescent once cooled to room temperature. The solution was transferred into an 800 ml glass bottle and stored under an inert nitrogen atmosphere at room temperature.

Preparative Example 2: Bimetallic Mg/Ti/Zr Precursor 280 ml of n-decane, 17.57 g (184.5 mmol) of magnesium chloride and 5.1 g of zirconium tetrachloride (21.9 mmol) were introduced in succession under a blanket of anhydrous nitrogen into a stirred, jacketed glass reactor of a volume of 1 liter. Stirring was continued for 10 minutes to homogenise the mixture and 5.78 g (17 mmol) of titanium tetrabutylate and 89.7 g (622 mmol) of 2-ethylhexanoic acid were added.

The nitrogen pressure was adjusted to 5 kPag at room temperature and the reactor was then sealed. Keeping the reactor sealed, the mixture was heated to 90° C. for 2 hours with stirring. The pressure rose to 127 kPag. A clear solution was obtained which became slightly opalescent once cooled to room temperature.

The solution was transferred into an 800 ml glass bottle and stored under an inert nitrogen atmosphere at room temperature.

Preparative Example 3: Bimetallic Mg/Ti/Hf Precursor

The same procedure with the same molar quantities as in the preceding preparative Example 2 was repeated, with the only difference that 6.98 g (equal to 21.8 mmol) of hafnium tetrachloride were used instead of 5.1 g of zirconium tetrachloride (21.9 mmol). The pressure during heating rose to 127 kPag.

A clear solution was obtained which became slightly opalescent once cooled to room temperature. This solution was transferred into an 800 ml glass bottle and stored under an inert nitrogen atmosphere at room temperature.

Example 1: Monometallic Catalyst (C1)

50 ml of the homogeneous monometallic solution prepared according to the preceding preparative Example 1 containing the following components was introduced into a 1 liter glass reaction flask equipped with a mechanical stirrer and thermostatically controlled by means of a silicone oil bath:
Ti=2.24 mmol
Mg=24.28 mmol
Cl=48.55 mmol
2-ethylhexanoate=66.15 mmol
(O-butyl)=8.96 mmol Approx. 200 ml of n-decane were added and stirring was continued with the temperature of the oil bath at 40° C. In total, 75.11 mmol of organic groups (O-butyl+$C_7H_{14}COO$—) were present. 24.39 ml of the solution in n-decane prepared using the method previously described in preparative Example A, containing 37.56 mmol of soluble $AlCl_3$.dioctyl ether (1:1) complex, were further diluted to 50 ml with n-decane, and added dropwise to the solution in the flask thermostatically controlled to 40° C. to obtain an Al/(O-butyl+$C_7H_{14}COO$—) molar ratio of 0.5, based on the quantity of organic groups present in the initial precursor solution. Stirring was continued and the temperature of the thermal bath was maintained at 40° C. during addition.

A white solid was observed to precipitate. The resultant suspension was adjusted to 60° C. by heating the thermal bath and stirred at this temperature for 1 hour. On completion, the temperature was reduced to room temperature and stirring was stopped. The clear supernatant liquid was sampled and analysed, yielding the following results:
Ti=7.47 mmol/liter (100% of introduced titanium)
Mg=absent It could thus be concluded that the resultant solid was composed of all the magnesium chloride, while the entirety of the titanium had remained in soluble form.

For the purpose of then achieving reduction to Ti(III) and subsequent precipitation of $TiCl_3$, the suspension, still being stirred at 40° C., was treated by dropwise addition of a 50 vol. % strength solution containing 2.7 g of DEAC in n-decane, equal to 22.4 mmol, in such a manner as to obtain a molar Al/Ti ratio of 10.

Once addition at constant temperature was complete, the temperature of the thermostatic bath was adjusted to 90° C. and stirring was continued for a further 2 hours. The temperature was reduced to ambient, with stirring being continued, and an aliquot of suspension was taken and filtered on a G3 sintered glass filter, washed with n-decane, dried under a stream of anhydrous nitrogen and analysed in accordance with the previously stated elemental analysis method, with the following results (composition in % by weight):
Ti=2.48%.
Mg=15.7%
Al=3.48%
Cl=58.35%
2-EHA=7.89%
corresponding to a formula of catalyst C1 which may be stated as follows:

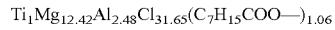

$Ti_1Mg_{12.42}Al_{2.48}Cl_{31.65}(C_7H_{15}COO\text{—})_{1.06}$

Example 2: Monometallic Catalyst (C2)

Exactly the same procedure described in the preceding Example 1 was used, but using an Al/(O-butyl+$C_7H_{15}COO$—) molar ratio of 0.33 based on the quantity of organic groups present in the initial precursor solution. 24.79 mmol of soluble $AlCl_3$.dioctyl ether (1:1 mol/mol) complex, equal to 16.1 ml of the solution prepared using the method previously described in preparative Example A, further diluted to 50 ml with n-decane, were added dropwise. The temperature was maintained at 40° C. during addition.

A white precipitate was observed to form. The resultant suspension was adjusted to 60° C. by heating the thermal bath and stirred at this temperature for 1 hour. On completion, the temperature was reduced to room temperature and stirring was stopped, leaving the mixture to settle for a few minutes. The clear supernatant liquid was sampled and found to contain:
Ti=7.38 mmol/liter (approx. 100% of initial titanium)
Mg=8.0 mmol/liter (approx. 10% of initial magnesium).

It could thus be concluded that the resultant solid was composed of virtually all the introduced magnesium chloride, while the entirety of the titanium had remained in soluble form.

For the purpose of then achieving reduction to Ti(III) and subsequent precipitation of $TiCl_3$, the suspension, still being stirred at 40° C., was treated by dropwise addition of a 50% strength solution containing 1.34 g of DEAC in n-decane, equal to 11.1 mmol, in such a manner as to obtain a molar Al/Ti ratio of 5.

On completion, after filtration through a sintered filter and drying under a stream of nitrogen, a solid catalyst was obtained at a yield of greater than 90% relative to the initial titanium, which, after having been dried and analysed, was found to have following composition (% by weight):
Ti=2.8%.
Mg=15.24%
Al=2.65%
Cl=59.04%
2-EHA=12.44%
corresponding to a formula of catalyst C2 which may be stated as follows:

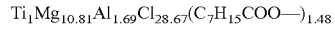

$Ti_1Mg_{10.81}Al_{1.69}Cl_{28.67}(C_7H_{15}COO\text{—})_{1.48}$

Example 3: Monometallic Catalyst (C3)

Exactly the same procedure as in Example 1 was followed, with the difference that the solution of the soluble $AlCl_3$.dioctyl ether (1:2 mol/mol) compound in n-decane was used.

28.5 ml of the solution in n-decane prepared using the method previously described in preparative Example B, having an Al concentration of 1.32 mmol/ml, corresponding to 37.56 mmol of soluble $AlCl_3$.dioctyl ether (1:2) complex, were further diluted to 50 ml with n-decane, and added dropwise to the solution in the flask thermostatically controlled to 40° C. to obtain an Al/(O-butyl+$C_7H_{15}$COO—) molar ratio of 0.5, based on the quantity of organic groups present in the initial precursor solution. Stirring was continued and the temperature of the thermal bath was maintained at 40° C. during addition.

A white precipitate was observed to form. The resultant suspension was adjusted to 60° C. by heating the thermal bath and stirred at this temperature for 1 hour. On completion, the temperature was reduced to room temperature and stirring was stopped, leaving the mixture to settle for a few minutes. The clear supernatant liquid was sampled and found to be composed of:
Ti=7.41 mmol (100% of introduced titanium)
Mg=(absent).

It could thus be concluded that the resultant solid was composed of all the magnesium chloride, while the entirety of the titanium had remained in soluble form.

The suspension, still being stirred at 40° C., was treated by dropwise addition of a 50% strength solution containing 4.02 g of DEAC in n-decane, equal to 33.35 mmol, in such a manner as to obtain a molar Al/Ti ratio of 15.

On completion, stirring of the suspension was continued for 2 hours at 90° C. The temperature was reduced and the solid separated as described in the preceding Example 2.

On elemental analysis, the solid catalyst C3 prepared in this manner was found to have the following composition:
Ti=4.0%.
Mg=15.4%
Al=3.8%
Cl=64.9%
2-EHA=8.1% corresponding to a formula of catalyst C3 which may be stated as follows:

$Ti_1Mg_{7.55}Al_{1.68}Cl_{21.76}(C_7H_{15}COO—)_{0.67}$

Example 4: Bimetallic Ti/Zr Catalyst (C4)

50 ml of the homogeneous bimetallic Mg/Ti/Zr solution prepared according to the preceding preparative Example 2 containing the following components was introduced into a 1 liter glass reaction flask equipped with a mechanical stirrer and thermostatically controlled by means of a silicone oil bath:
Ti=2.21 mmol
Mg=23.96 mmol
Cl=59.3 mmol
Zr=2.84 mmol
2-ethylhexanoate=80.78 mmol
(O-butyl)=8.84 mmol Approx. 200 ml of n-decane were added and stirring was continued with the temperature of the oil bath at 40° C. In total, 89.62 mmol of organic groups (O-butyl+$C_7H_{15}$COO—) were present.

At this point, 89.62 mmol of soluble $AlCl_3$.dioctyl ether (1:1 mol/mol) complex, equal to 58.19 ml of the solution prepared using the method previously described in preparative Example A, adjusted to a volume of 100 ml with n-decane prior to addition, were added dropwise in such a manner as to obtain an Al/(O-butyl+$C_7H_{15}$COO—) ratio of 1, based on the quantity of organic groups present in the initial precursor solution. Stirring was continued and the temperature of the thermal bath was maintained at 40° C. during addition.

A white precipitate was observed to form. The resultant suspension was adjusted to 60° C. by heating the thermal bath and stirred at this temperature for 1 hour. On completion, the temperature was reduced to room temperature and stirring was stopped. The supernatant liquid was sampled and found to be composed of:
Ti=7.36 mM/l (100% of introduced titanium)
Mg=absent
Zr=absent It could thus be concluded that the resultant solid was composed of all the magnesium chloride and the zirconium tetrachloride, while the entirety of the titanium had remained in soluble form.

For the purpose of then achieving reduction to Ti(III) and subsequent precipitation of $TiCl_3$, the suspension, still being stirred at 40° C., was treated by dropwise addition of a 50 vol. % strength solution containing 2.66 g of DEAC in decane, equal to 22.1 mmol, in such a manner as to obtain a molar Al/Ti ratio of 10.

Once addition at constant temperature was complete, the temperature of the thermostatic bath was adjusted to 60° C. and stirring was continued for a further 1 hour. The temperature was reduced to ambient, stirring was stopped and, once approx. five minutes had elapsed, an aliquot of suspension was taken and filtered on a G3 sintered glass filter, washed with n-decane, dried under a stream of anhydrous nitrogen and analysed in accordance with the previously stated elemental analysis method, with the following results (% by weight).
Ti=4.43%.
Mg=15.75%
Zr=10.23%
Al=1.26%
Cl=58.51%
2-EHA=6.56% corresponding to a formula of catalyst C4 which may be stated as follows:

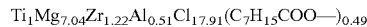

$Ti_1Mg_{7.04}Zr_{1.22}Al_{0.51}Cl_{17.91}(C_7H_{15}COO—)_{0.49}$

Example 5: Bimetallic Ti/Zr Catalyst (C5)

The precipitation step with $AlCl_3$.dioctyl ether 1/1 was repeated using the same procedures and quantities of reactants as in the preceding Example 4, with the difference that, at the end of addition of the soluble aluminium complex, the reaction mixture was adjusted to a temperature of 90° C. for 2 hours. At this point, stirring was stopped and the supernatant liquid was sampled and found to be composed of:
Ti=7.26 mM/l (approx. 100% of introduced titanium)
Mg=absent.
Zr=absent.

The precipitated solid was thus composed of all the magnesium chloride and the zirconium tetrachloride, while the entirety of the titanium had remained in soluble form.

The suspension, still being stirred at 40° C., was treated by dropwise addition of a 50 vol. % strength solution containing 1.31 g of DEAC in n-decane, equal to 10.89 mmol, in such a manner as to obtain a molar Al/Ti ratio of 5. On completion, the suspension was adjusted to a temperature of 90° C., and stirring was continued for 2 hours.

On completion, the mixture was filtered on a sintered glass filter, washing performed twice with 50 ml of n-decane, drying performed under a stream of anhydrous nitrogen, in order to obtain a solid catalyst having the following composition by weight, determined by means of elemental analysis using the previously described method:
Ti=3.4%
Mg=17.2%

Zr=9.6%
Al=3.31%
Cl=61.4%
2-EHA=3.56% corresponding to a formula of catalyst C5 which may be stated as follows:

$$Ti_1Mg_{10.0}Zr_{1.48}Al_{1.73}Cl_{24.36}(C_7H_{15}COO-)_{0.35}$$

Example 6: Bimetallic Ti/Zr Catalyst (C6)

In a similar manner to the preceding Example 4, 50 ml of the homogeneous bimetallic Mg/Ti/Zr solution, prepared according to the preceding preparative Example 2, were introduced into a 1 liter glass flask and diluted with approx. 200 ml of anhydrous n-decane. Using the same procedures as in Example 4, 44.81 mmol of soluble AlCl$_3$.dioctyl ether (1:2 mol/mol) complex, equal to 33.95 ml of the solution prepared using the method previously described in preparative Example B, adjusted to a volume of 50 ml with n-decane prior to addition, were added to obtain an Al/(O-butyl+C$_7$H$_{15}$COO—) ratio of 0.5, based on the quantity of organic groups present in the initial precursor solution. Stirring was continued and the temperature of the thermal bath was maintained at 40° C. during addition.

A white precipitate was observed to form. The resultant suspension was adjusted to 60° C. by heating the thermal bath and stirred at this temperature for 1 hour. On completion, the temperature was reduced to room temperature and stirring was stopped. The supernatant liquid was sampled and found to be composed of:
Ti=7.37 mM/l (100% of introduced titanium)
Mg=absent
Zr=absent It could thus be concluded that the resultant solid was composed of all the magnesium chloride and the zirconium tetrachloride, while the entirety of the titanium had remained in soluble form.

For the purpose of then achieving reduction to Ti(III) and subsequent precipitation of TiCl$_3$, the suspension, still being stirred at 40° C., was treated by dropwise addition of a 50 vol. % strength solution containing 6.57 g of TIBA in decane, equal to 33.17 mmol, in such a manner as to obtain a molar Al/Ti ratio of 15.

Once addition at constant temperature was complete, the temperature of the thermostatic bath was adjusted to 60° C. and stirring was continued for a further 1 hour. On completion, the mixture was filtered on a sintered glass filter, washing performed twice with 50 ml of n-decane, drying performed under a stream of anhydrous nitrogen, in order to obtain a solid catalyst having the following composition by weight, determined in accordance with the previously stated elemental analysis method.
Ti=3.29%
Mg=16.2%
Zr=8.91%
Al=0.5%
Cl=66.07%
2-EHA=4.02% corresponding to the following formula of catalyst C6:

$$Ti_1Mg_{9.7}Zr_{1.42}Al_{0.28}Cl_{27.23}(C_7H_{15}COO-)_{0.4}$$

Example 7: Bimetallic Ti/Hf Catalyst (C7)

50 ml of the homogeneous bimetallic Mg/Ti/Hf solution prepared according to the preceding preparative Example 3 were introduced, together with approx. 200 ml of n-decane, into a 1 liter glass flask equipped with a mechanical stirrer and thermostatically controlled by means of a silicone oil bath, and stirred with the temperature of the oil bath at 40° C. to homogenise the mixture.

The resultant solution contained, on the basis of the calculated quantities of preparative Example 3:
Ti=2.21 mmol
Mg=23.96 mmol
Cl=59.25 mmol
Hf=2.83 mmol
2-ethylhexanoate=80.78 mmol
(O-butyl)=8.83 mmol At this point, 58.19 (correct value) ml of soluble AlCl$_3$.dioctyl ether (1:1 mol/mol) complex, (prepared as described previously in preparative Example A), adjusted to a volume of 50 ml with n-decane prior to addition, were added dropwise in such a manner as to obtain an Al/(O-butyl+C$_7$H$_{15}$COO—) ratio of 1, based on the quantity of organic groups present in the initial precursor solution.

Stirring was continued and the temperature of the thermal bath was maintained at 40° C. during addition. A white precipitate was observed to form. The resultant suspension was adjusted to 60° C. by heating the thermal bath and stirred at this temperature for 1 hour. On completion, the temperature was reduced to room temperature. At this point, stirring was stopped and the supernatant liquid was sampled and found to be composed of:
Ti=7.35 mM/l (100% of input titanium)
Mg=absent
Hf=absent It could thus be concluded that the resultant solid was composed of all the input magnesium chloride and hafnium tetrachloride, while the entirety of the titanium had remained in soluble form.

For the purpose of then achieving chlorination and reduction to Ti(III), the suspension, still being stirred at 40° C., was treated with 50% DEAC in decane.

The quantity of pure DEAC was 2.66 g, equal to 22.05 mmol, in such a manner as to obtain a molar Al/Ti ratio of 10.

Once addition at constant temperature was complete, the temperature was raised to 60° C. by increasing the temperature of the thermostatic bath and stirring was continued for a further 1 hour.

The temperature was reduced to ambient, stirring was stopped and, on completion, an aliquot of suspension was filtered on a G3 sintered glass filter and dried under a stream of hot nitrogen. An accurately weighed quantity of the dry solid was analysed in accordance with the previously stated elemental analysis method to obtain the following results by weight:
Ti=3.23%.
Mg=16.75%
Hf=16.42%
Al=1.26%
Cl=58.51%
2-EHA=3.55% corresponding to a formula of catalyst C7 which may be stated as follows:

$$Ti_1Mg_{10.29}Hf_{1.37}Al_{0.7}C_{24.6}(C_7H_{15}COO-)_{0.37}$$

Example 8: Bimetallic Ti/Hf Catalyst (C8)

The same procedure and quantities as stated in Example 7 were used, with the sole difference that, once addition of the soluble AlCl$_3$.dioctyl ether (1:1 mol/mol) complex was complete, the temperature was adjusted to 90° C. for 2 hours. On completion, the temperature was reduced to room temperature. At this point, stirring was stopped and the supernatant liquid was sampled and found to be composed of:
Ti=7.33 mM/l (100% of input titanium)
Mg=absent
Hf=absent It could thus be concluded that the resultant solid was composed of all the magnesium chloride and hafnium tetrachloride, while the entirety of the titanium had remained in soluble form.

The same procedure and quantities as in Example 7 were then used for the subsequent addition of DEAC but, on completion, the suspension was adjusted to a temperature of 90° C. and stirring was continued for 2 hours. The quantity of pure DEAC was 2.66 g, equal to 22.05 mmol, in such a manner as to obtain a molar Al/Ti ratio of 10.

On completion, a dried solid catalyst was obtained having the following composition by weight, analysed in accordance with the previously stated elemental analysis method:
Ti=2.3%
Mg=12.09%
Hf=11.13%
Al=4.93%
Cl=54.7%
2-EHA=7.77%
corresponding to a formula of catalyst C8 which may be stated as follows:

$$Ti_1Mg_{10.38}Hf_{1.29}Al_{3.81}Cl_{32.1}(C_7H_{15}COO—)_{1.12}$$

Example 9: Bimetallic Ti/Hf Catalyst (C9)

Exactly the same procedure was followed as in Example 7, with the difference that a soluble AlCl$_3$.dioctyl ether (1:2 mol/mol) compound was used, having an Al concentration (in n-decane) of 1.32 mmol/ml. Addition was carried out in such a manner as to achieve an Al/(O-butyl+C$_7$H$_{15}$COO—) molar ratio of 1.5 (60.44 ml of the solution of complex prepared in preparative Example B). Stirring was continued and the temperature of the mixture was maintained at 40° C. during addition.

A white precipitate was observed to form. The resultant suspension was adjusted to 60° C. by heating the thermal bath and stirred at this temperature for 1 hour. On completion, the temperature was reduced to room temperature.

At this point, stirring was stopped and the supernatant liquid was sampled and found to be composed of:
Ti=6.30 mM/l (100% of input titanium)
Mg=absent
Hf=absent It could thus be concluded that the resultant solid was composed of all the input magnesium chloride and hafnium tetrachloride and part of the input AlCl$_3$, while the entirety of the titanium had remained in soluble form. The suspension was then treated with 5.47 g of pure EASC, equal to 22.1 mmol, diluted to 50% in n-decane, in such a manner as to achieve a molar Al/Ti ratio of 10. On completion of addition at a constant temperature of 40° C., the suspension was heated to 90° C. and stirring was continued for 2 hours.

Analysis of the dried catalyst yielded the following results by weight:
Ti=3.29%
Mg=17.2%
Hf=19.14%
Al=0.5%
Cl=56.07%
2-EHA=3.03%
corresponding to a formula:

$$Ti_1Mg_{10.26}Hf_{1.55}Al_{0.28}Cl_{22.88}(C_7H_{15}COO—)_{0.31}$$

Example 10: Monometallic Catalyst (C10)

50 ml of the monometallic Mg/Ti solution, obtained as described above in accordance with preparative Example 1, together with approx. 200 ml of decane, were introduced into a 1 liter flask, stirred mechanically, immersed in a thermal bath filled with silicone oil for thermostatic control and maintained under an inert atmosphere with anhydrous nitrogen, and stirred with the temperature of the oil bath at 40° C. to homogenise the mixture.

The resultant solution contained, on the basis of the input weighed quantities in preparative Example 1:
Ti=2.24 mmol
Mg=24.28 mmol
Cl=48.55 mmol
2-EHA=66.15 mmol
(O-butyl)=8.96 mmol At this point, 37.56 mmol of soluble AlCl$_3$.xylene.HCl complex, equal to 5.56 ml of the solution prepared using the method previously described in preparative Example C, were added dropwise to obtain a molar Al/(O-butyl+RCOO—) ratio of 0.5, based on the quantity of organic groups present in the initial precursor solution.

Stirring was continued and the temperature of the thermal bath was maintained at 40° C. during addition. A white solid was observed to precipitate. The resultant suspension was adjusted to 60° C. by heating the thermal bath and stirred at this temperature for 1 hour. On completion, the temperature was reduced to room temperature. At this point, stirring was stopped and the clear supernatant liquid was sampled and analysed, yielding the following results:
Ti=8.52 mM/l (100% of input titanium)
Mg=absent It could thus be concluded that the resultant solid contained all the initially introduced magnesium, while the entirety of the titanium had remained in soluble form.

For the purpose of then achieving reduction to Ti(III) and subsequent precipitation of TiCl$_3$, the suspension, still being stirred at 40° C., was treated with 2.53 g of 50% TEA in decane, equal to 22.15 mmol, in such a manner as to obtain a molar Al/Ti ratio of 10. Once addition at constant temperature was complete, the temperature was raised to 90° C. by increasing the temperature of the thermostatic bath and stirring was continued for 2 hours. The temperature was reduced to ambient and, on completion, an aliquot of suspension was filtered on a G3 sintered glass filter and dried under a stream of anhydrous nitrogen.

An accurately weighed quantity of the dry solid was analysed in accordance with the previously stated elemental analysis method to obtain the following results (composition in % by weight):
Ti=3.2%.
Mg=14.9%
Al=2.48%
Cl=68.35%
2-EHA=7.67%
corresponding to a formula of catalyst C10 which may be stated as follows:

$$Ti_1Mg_{9.15}Al_{1.37}Cl_{28.74}(C_7H_{15}COO—)_{0.79}$$

Example 11: Bimetallic Ti/Zr Catalyst (C11)

50 ml of the bimetallic Mg/Ti/Zr solution, obtained as described above in accordance with the preceding preparative Example 2, together with approx. 200 ml of n-decane, were introduced into a 1 liter glass flask, equipped with a mechanical stirrer, immersed in a thermal bath filled with silicone oil for thermostatic control and maintained under an inert atmosphere with nitrogen, and stirred with the temperature of the oil bath at 40° C. to homogenise the mixture.

The resultant solution contained, on the basis of the calculated weighed quantities of preparative Example 2:
Ti=2.21 mmol
Mg=23.96 mmol
Cl=59.3 mmol
Zr=2.84 mmol
2-EHA=80.78 mmol
(O-butyl)=8.84 mmol A total of 89.62 mmol of organic residue (O-butyl+$C_7H_{15}$COO—) were thus considered to be present. Over the course of approx. 40 minutes, 13.28 ml of soluble $AlCl_3$.xylene.HCl complex, prepared as described in preparative Example C, equal to 89.61 mmol of soluble $AlCl_3$.xylene.HCl complex, were added slowly to obtain an Al/(O-butyl+$C_7H_{15}$COO—) ratio of 1 based on the quantity of (O-butyl+$C_7H_{15}$COO—) groups present in the initial precursor solution. Stirring was continued and the temperature of the reaction mixture was maintained at 40° C. during addition. A white precipitate was observed to form. The resultant suspension was adjusted to 60° C. by heating the thermal bath and stirred at this temperature for 1 hour. On completion, the temperature was reduced to room temperature and stirring was stopped. After a few minutes, the clear supernatant liquid was sampled and found to be composed of:
Ti=8.36 mM/l (100% of total)
Mg=absent
Zr=absent It could thus be concluded that the resultant solid contained all the input magnesium and zirconium, while the entirety of the titanium had remained in soluble form.

For the purpose of achieving chlorination and reduction of the titanium to Ti(III), the suspension, still being stirred, was treated by slowly adding, at a constant temperature of 40° C., 6.58 g of TIBA (33.23 mmol) diluted to 50 vol. % in decane, in such a manner as to obtain a molar Al/Ti ratio of 15. Once addition was complete, the temperature was raised to 90° C. by increasing the temperature of the thermostatic bath and stirring was continued for 2 hours.

The temperature was then reduced to ambient and an aliquot of suspension was filtered on a G3 sintered glass filter. The solid separated in this manner was dried under a stream of hot nitrogen and analysed in accordance with the previously stated elemental analysis method to obtain the following results by weight:
Ti=2.98%.
Mg=13.75%
Zr=8.23%
Al=2.26%
Cl=68.51%
2-EHA=3.56% corresponding to a formula of catalyst C11 which may be stated as follows:

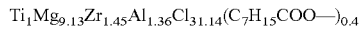

$Ti_1Mg_{9.13}Zr_{1.45}Al_{1.36}Cl_{31.14}(C_7H_{15}COO—)_{0.4}$

Example 12: Bimetallic Ti/Hf Catalyst (C12)

50 ml of the bimetallic Mg/Ti/Hf solution, obtained as described above in accordance with the preceding preparative Example 3, together with approx. 200 ml of n-decane, were introduced into a 1 liter glass flask, equipped with a mechanical stirrer, immersed in a thermal bath filled with silicone oil for thermostatic control and maintained under an inert atmosphere with nitrogen, and stirred with the temperature of the oil bath at 40° C. to homogenise the mixture.

The resultant solution contained, on the basis of the calculated weighed quantities of preparative Example 3:
Ti=2.21 mmol
Mg=23.96 mmol
Cl=59.25 mmol
Hf=2.83 mmol
2-EHA=80.78 mmol
(O-butyl)=8.83 mmol A total of 89.61 mmol of organic residue (O-butyl+$C_7H_{15}$COO—) were thus considered to be present. Over the course of approx. 50 minutes, 13.28 ml of the solution prepared as described above in preparative Example C, equal to 89.61 mmol of soluble $AlCl_3$.xylene.HCl complex, were added slowly to obtain an Al/(O-butyl+$C_7H_{15}$COO—) ratio of 1 based on the quantity of (O-butyl+RCOO—) groups present in the initial precursor solution. Stirring was continued and the temperature of the reaction mixture was maintained at 40° C. during addition. A white precipitate was observed to form. The resultant suspension was adjusted to 60° C. by heating the thermal bath and stirred at this temperature for 1 hour. On completion, the temperature was reduced to room temperature and stirring was stopped. After a few minutes, the clear supernatant liquid was sampled and found to be composed of:
Ti=8.25 mM/l (100% of input titanium)
Mg=absent
Hf=absent It could thus be concluded that the resultant solid contained all the input magnesium and hafnium, while the entirety of the titanium had remained in soluble form.

For the purpose of achieving chlorination and reduction of the titanium to Ti(III), the suspension, still being stirred, was treated by slowly adding, at a constant temperature of 40° C., 2.64 g of DEAC (21.86 mmol) diluted to 50 vol. % in decane, in such a manner as to obtain a molar Al/Ti ratio of 10. Once addition was complete, the temperature was raised to 90° C. by increasing the temperature of the thermostatic bath and stirring was continued for 2 hours.

The temperature was then reduced to ambient and an aliquot of suspension was filtered on a G3 sintered glass filter. The solid separated in this manner was dried under a stream of hot nitrogen and analysed in accordance with the previously stated elemental analysis method to obtain the following results by weight:
Ti=2.75%.
Mg=14.71%
Hf=14.22%
Al=1.26%
Cl=65.51%
2-EHA=1.26% corresponding to a formula of catalyst C12 which may be stated as follows:

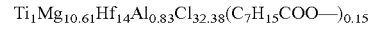

$Ti_1Mg_{10.61}Hf_{14}Al_{0.83}Cl_{32.38}(C_7H_{15}COO—)_{0.15}$

Example 13: Bimetallic Ti/Zr Catalyst (C13)

The procedure of the preceding Example 11 was repeated with the same reactants and using the same conditions, with the sole difference that, in the titanium reduction and precipitation step, 2.73 g (22.65 mmol) of DEAC were added instead of 6.58 g of TIBA, in such a manner as to obtain a molar Al/Ti ratio of 10. On completion, the temperature was reduced to ambient and an aliquot of suspension was filtered on a G3 sintered glass filter. The solid separated in this manner was dried under a stream of hot nitrogen and analysed in accordance with the previously stated elemental analysis method to obtain the following results by weight:
Ti=3.12%.
Mg=15.82%
Zr=8.43%
Al=2.36%
Cl=66.71%
2-EHA=2.86% corresponding to a formula of catalyst C13 which may be stated as follows:

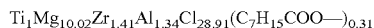

$Ti_1Mg_{10.02}Zr_{1.41}Al_{1.34}Cl_{28.91}(C_7H_{15}COO-)_{0.31}$

Example 14: Bimetallic Ti/Zr Catalyst (C14)

The procedure of the preceding Example 11 was repeated with the same reactants and using the same conditions, with the sole difference that, in the titanium reduction and precipitation step, 2.81 g (11.35 mmol) of EASC were added instead of 6.58 g of TIBA, in such a manner as to obtain a molar Al/Ti ratio of 5. On completion, the temperature was reduced to ambient and an aliquot of suspension was filtered on a G3 sintered glass filter. The solid separated in this manner was dried under a stream of hot nitrogen and analysed in accordance with the previously stated elemental analysis method to obtain the following results by weight:
Ti=3.01%.
Mg=15.15%
Zr=8.44%
Al=1.95%
Cl=65.75%
2-EHA=4.01% corresponding to a formula of catalyst C14 which may be stated as follows:

$Ti_1Mg_{9.81}Zr_{1.47}Al_{1.14}Cl_{29.40}(C_7H_{15}COO-)_{0.44}$

Example 15: Monometallic Ti Catalyst (C15)

50 ml of the monometallic solution prepared according to the preceding preparative Example 1, and approx. 200 ml of n-decane were introduced into a 1 liter flask equipped with a mechanical stirrer, immersed in a silicone oil bath for thermostatic control and maintained under an inert atmosphere with anhydrous nitrogen. Stirring was continued stirred with the temperature of the oil bath at 40° C. to homogenise the mixture.

The resultant solution contained, on the basis of the input weighed quantities in preparative Example 1:
Ti=2.24 mmol
Mg=24.28 mmol
Cl=48.55 mmol
2-ethylhexanoic acid=66.15 mmol
(O-butyl)=8.96 mmol A total of 75.11 mmol of organic groups (O-butyl+$C_7H_{15}COO-$) were thus present.

Over a time of approx. 40 minutes, 50 ml of a solution in n-decane containing 24.79 mmol of soluble $AlCl_3$.dioctyl ether (1:1) complex, obtained by diluting 16.1 ml of the solution prepared using the method previously described in preparative Example A, were added slowly to said solution. A molar Al/(O-butyl+$C_7H_{15}COO-$) ratio of 0.33, based on the quantity of organic groups present in the initial precursor solution, was obtained. Stirring was continued and the temperature of the thermal bath was maintained at 40° C.

during addition. The temperature of the reaction mixture varied from 40 to 42° C. over the course of addition. A white solid was observed to precipitate. The resultant suspension was adjusted to 60° C. by heating the thermal bath and stirred at this temperature for 1 hour. On completion, the temperature was reduced to room temperature.

At this point, stirring was stopped and, after a few minutes, the clear supernatant liquid was sampled and analysed, yielding the following results:
Ti=7.27 mM/l (100% of introduced titanium)
Mg=absent It could thus be concluded that the resultant solid contained all the initially introduced magnesium, while the entirety of the titanium had remained in soluble form.

For the purpose of achieving chlorination and reduction of the titanium to Ti(III) and subsequent precipitation of $TiCl_3$, the suspension, still being stirred, was treated by slowly adding, at a constant temperature of 40° C., 0.767 g of TEA (6.72 mmol) diluted to 50 vol. % in n-decane, in such a manner as to obtain a molar Al/Ti ratio of 3. Once addition was complete, the temperature was raised to 90° C. by increasing the temperature of the thermostatic bath and stirring was continued for 2 hours.

The temperature was reduced to ambient and, on completion, an aliquot of suspension was filtered on a G3 sintered glass filter and dried under a stream of anhydrous nitrogen. An accurately weighed quantity of the dried solid was analysed in accordance with the previously stated elemental analysis method to obtain the following results (composition in % by weight):
Ti=3.18%.
Mg=15.9%
Al=3.84%
Cl=61.70%
2-EHA=10.27% corresponding to a formula of catalyst C15 which may be stated as follows:

$Ti_1Mg_{9.85}Al_{2.14}Cl_{26.20}(C_7H_{15}COO-)_{1.08}$

Example 16: Bimetallic Ti/Zr Catalyst Supported on $MgCl_2$ (C16)

50 ml of the homogeneous bimetallic Mg/Ti/Zr solution described above in preparative Example 2, together with approx. 200 ml of n-decane, were introduced into a flask equipped with a mechanical stirrer, immersed in a silicone oil bath for thermostatic control and maintained under an inert atmosphere with nitrogen, and stirred with the temperature of the oil bath at 40° C. to homogenise the mixture.

The resultant solution contained, on the basis of the calculated quantities of preparative Example 2:
Ti=2.21 mmol
Mg=23.96 mmol
Cl=59.3 mmol
Zr=2.84 mmol
2-EHA=80.78 mmol
(O-butyl)=8.84 mmol A total 89.62 mmol of (O-butyl+$C_7H_{15}COO-$) were thus considered to be present.

At this point, 89.62 mmol of soluble $AlCl_3$.dioctyl ether (1:1 mol/mol) complex, equal to 58.19 ml of the solution prepared using the method previously described in preparative Example A and further diluted to 50 ml with n-decane, were added dropwise in a time of approx. 40 minutes to obtain in this manner an Al/(O-butyl+$C_7H_{15}COO-$) ratio of 1, based on the quantity of organic groups present in the initial precursor solution.

Stirring was continued and the temperature of the thermal bath was maintained at 40° C. during addition. The temperature of the reaction mixture was maintained between 39 and 41° C.

A white precipitate was observed to form. The resultant suspension was adjusted to 60° C. by heating the thermal bath and stirred at this temperature for 1 hour. On completion, the temperature was reduced to room temperature, stirring was stopped and the supernatant liquid was sampled and found to be composed of:
Ti=7.47 mM/l (100% of introduced titanium)
Mg=absent
Zr=absent It could thus be concluded that the resultant solid contained all the initially introduced magnesium and zirconium, while the entirety of the titanium had remained in soluble form. For the purpose of then achieving reduction and chlorination of the titanium to Ti(III) and subsequent precipitation of TiCl$_3$, the suspension, still being stirred at 40° C., was treated with 50% DEAC in decane.

The quantity of pure DEAC was 0.8 g, equal to 6.63 mmol, in such a manner as to obtain a molar Al/Ti ratio of 3.

Once addition at constant temperature was complete, the temperature was raised to 60° C. by increasing the temperature of the thermostatic bath and stirring was continued for a further 1 hour.

The temperature was reduced to ambient, stirring was stopped and, on completion, an aliquot of suspension was filtered on a G3 sintered glass filter and dried under a stream of hot nitrogen. An accurately weighed quantity of the dry solid was analysed in accordance with the previously stated elemental analysis method to obtain the following results by weight:
Ti=4.03%.
Mg=16.62%
Zr=9.92%
Al=1.36%
Cl=56.48%
2-EHA=7.26% corresponding to a formula of catalyst C16 which may be stated as follows:

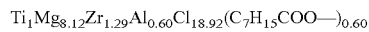

$$Ti_1Mg_{8.12}Zr_{1.29}Al_{0.60}Cl_{18.92}(C_7H_{15}COO-)_{0.60}$$

Example 17: Bimetallic Ti/Hf Catalyst Supported on MgCl$_2$ (C17)

50 ml of the homogeneous bimetallic Mg/Ti/Hf solution described above in accordance with preparative Example 3, together with approx. 200 ml of n-decane, were introduced into a flask equipped with a mechanical stirrer, immersed in a silicone oil bath for thermostatic control and maintained under an inert atmosphere with nitrogen, and stirred with the temperature of the oil bath at 40° C. to homogenise the mixture.

The resultant solution contained, on the basis of the calculated quantities of preparative Example 3:
Ti=2.21 mmol
Mg=23.96 mmol
Cl=59.25 mmol
Hf=2.83 mmol
2-EHA=80.78 mmol
(O-butyl)=8.83 mmol A total 89.61 mmol of (O-butyl+C$_7$H$_{15}$COO—) were thus considered to be present.

At this point, 34.54 ml of the solution of the AlCl$_3$.dioctyl ether (1:1 mol/mol) complex, prepared as described in preparative Example A, and further diluted to 50 ml with n-decane, were added dropwise in a time of approx. 40 minutes. The input quantity permitted an Al/(O-butyl+ C$_7$H$_{15}$COO—) ratio of 1, based on the quantity of organic groups present in the initial precursor solution.

Stirring was continued and the temperature of the thermal bath was maintained at 40° C. during addition. The temperature of the reaction mixture varied between 39 and 41° C.

A white precipitate was observed to form. The resultant suspension was adjusted to 60° C. by heating the thermal bath and stirred at this temperature for 1 hour. On completion, the temperature was reduced to room temperature. At this point, stirring was stopped for a few minutes, the supernatant liquid was sampled and found to be composed of:
Ti=7.43 mM/l (100% of input titanium)
Mg=absent
Hf=absent It could thus be concluded that the resultant solid was composed of all the input magnesium chloride and hafnium tetrachloride, while the entirety of the titanium had remained in soluble form.

For the purpose of then achieving reduction to Ti(III), the suspension, still being stirred at 40° C., was treated with 50% TEA in decane.

The quantity of pure TEA was 0.76 g, equal to 6.66 mmol, in such a manner as to obtain a molar Al/Ti ratio of 3.

Once addition at constant temperature was complete, the temperature was raised to 60° C. by increasing the temperature of the thermostatic bath and stirring was continued for a further 1 hour. The temperature was reduced to ambient, stirring was stopped and, on completion, an aliquot of suspension was filtered on a G3 sintered glass filter and dried under a stream of hot nitrogen.

An accurately weighed quantity of the dry solid was analysed in accordance with the previously stated elemental analysis method to obtain the following results by weight:
Ti=3.33%.
Mg=16.95%
Hf=16.23%
Al=1.36%
Cl=56.51%
2-EHA=4.32% corresponding to a formula of catalyst C17 which may be stated as follows:

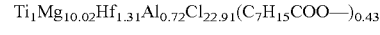

$$Ti_1Mg_{10.02}Hf_{1.31}Al_{0.72}Cl_{22.91}(C_7H_{15}COO-)_{0.43}$$

Example 18: Bimetallic Ti/Hf Catalyst Supported on MgCl$_2$ (C18)

The same procedure and quantities as stated in Example 17 were used, with the sole difference that, once addition of the soluble AlCl$_3$.dioctyl ether (1:1 mol/mol) complex was complete, the temperature was adjusted to 90° C. for 2 hours.

On completion, the temperature was reduced to room temperature.

At this point, stirring was stopped and the supernatant liquid was sampled and found to be composed of:
Ti=7.52 mM/l (100% of input titanium)
Mg=absent
Hf=absent It could thus be concluded that the resultant solid was composed of all the magnesium chloride and hafnium tetrachloride, while the entirety of the titanium had remained in soluble form.

For the purpose of then achieving chlorination and reduction of the titanium to Ti(III), the suspension, still being stirred at 40° C., was treated with 0.82 g, equal to 6.80 mmol of DEAC diluted to 50% in decane, in such a manner as to obtain an Al/Ti ratio of 3.

On completion, the suspension was adjusted to a temperature of 90° C., and stirring was continued for 2 hours. On completion, a dried solid catalyst was obtained having the following composition:

Ti=2.63%
Mg=14.21%
Hf=11.28%
Al=5.12%
Cl=52.7%
2-EHA=7.92% corresponding to a formula of catalyst C18 which may be stated as follows:

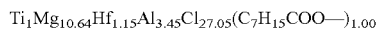

$Ti_1Mg_{10.64}Hf_{1.15}Al_{3.45}Cl_{27.05}(C_7H_{15}COO-)_{1.00}$

Example 19: Copolymerisation of Ethylene and 1-hexene with Catalyst (C1)

At least three vacuum-nitrogen cycles were performed for an overall duration of approx. 2 hours in a Brignole type 5 liter steel autoclave equipped with a burette for adding the catalyst, a propeller stirrer and a heating element connected to a thermostat for temperature control. A solution containing 1900 ml of decane, 75 ml of 1-hexene and 1.0 ml of a 1 M solution of triisobutylaluminium (TIBA; 1.0 mmol) in n-decane as cocatalyst (molar Al/Ti ratio=106) was introduced into the autoclave. The internal temperature of the reactor was adjusted to 190° C. and 18.15 mg of catalyst C1, obtained in accordance with the preceding Example 1 (9.40 µmol of Ti), as a suspension in approx. 10 ml of n-decane were introduced by means of the burette under a slight ethylene overpressure. Pressurisation was performed with ethylene, stirring being continued, until a total pressure in the autoclave of 15 barg was achieved. Heating by the element was stopped and an increase in temperature due to the exothermic nature of the polymerisation reaction was observed. The amount of the variation in enthalpy (DH) may be directly correlated to the activity of the converted ethylene and was proportional to the catalytic activity obtained; the flow rate of ethylene required to replenish that converted into polymer was also recorded by means of calibrated ASA flowmeters with an analogue volumetric meter. Polymerisation was continued for 5 minutes while maintaining the system at a constant pressure of 15 bar. The reaction was finally brought to an end by introducing approx. 10 ml of ethanol into the autoclave. The temperature was allowed to drop and the reactor contents were then discharged into approx. 3 liters of ethanol. The polymer was separated by means of filtration, washed with acetone and dried in an oven under a vacuum (approx. 100 Pa) at 90° C. for approx. 12 hours. On completion, 84 g of ethylene/1-hexene copolymer were obtained and characterised by measuring the content of 1-hexene, the melt flow index and density. The results are shown in Table 1 below.

Example 20: Copolymerisation of Ethylene and 1-hexene with Catalyst C2

The same procedures as previously described in Example 19 were used, with the difference that 23.93 mg of the catalyst prepared in the preceding Example 2 (C2) (13.99 µmol Ti) as a suspension in approx. 15 ml of n-decane, and 1 ml of a 1 M solution of TIBA (1 mmol) in n-decane as cocatalyst (molar Al/Ti ratio=71) were introduced into the autoclave. On completion, 89 g of ethylene/1-hexene copolymer were obtained having the characteristics stated in Table 1.

Example 21: copolymerisation of ethylene and 1-hexene with catalyst C3

The same procedures as previously described in Example 19 were used, with the difference that 16.50 mg of the catalyst prepared in the preceding Example 3 (C3) (13.78 µmol Ti) as a suspension in approx. 10 ml of n-decane, and 1 ml of a 1 M solution of TIBA (molar Al/Ti ratio=73) were respectively introduced into the autoclave. On completion, 73 g of ethylene/1-hexene copolymer were obtained having the characteristics stated in Table 1.

TABLE 1

Copolymerisation of ethylene/1-hexene with monometallic Ti catalysts supported on $MgCl_2$; initial temperature 190° C.; cocatalyst TIBA; $P_{total}$ = 15 bar.

| Example | Cat. | Ti (mg) | $Al_{TIBA}/Ti$ | 1-Hexene (ml) | Yield (g) | Activity (kg/$g_{Ti}$) | MFI 2.16 g/10' | Density g/cm³ |
|---|---|---|---|---|---|---|---|---|
| 19 | C1 Mg/Ti | 0.45 | 106 | 75 | 84 | 187 | 0.63 | 0.928 |
| 20 | C2 Mg/Ti | 0.67 | 71 | 75 | 89 | 132 | 0.76 | 0.931 |
| 21 | C3 Mg/Ti | 0.66 | 73 | 75 | 73 | 110 | 0.60 | 0.933 |

Example 22: Copolymerisation of Ethylene and 1-hexene with Catalyst C4

The same procedures as previously described in Example 19 were used, with the difference that 14.22 mg of catalyst C4, obtained in accordance with Example 4 (13.15 µmol Ti) as a suspension in approx. 10 ml of n-decane, and 1 ml of a 1 M solution of TIBA (molar Al/Ti ratio=76) were respectively introduced into the autoclave. On completion, 94 g of ethylene/1-hexene copolymer were obtained having the characteristics stated in Table 2.

Example 23: Copolymerisation of Ethylene and 1-hexene with Catalyst C5

The same procedures as previously described in Example 19 were used, with the difference that 19.41 mg of catalyst C5, obtained in accordance with Example 5 (13.78 µmol Ti) as a suspension in approx. 10 ml of n-decane, and 1 ml of a 1 M solution of TIBA (molar Al/Ti ratio=73) were respectively introduced into the autoclave. On completion, 73 g of ethylene/1-hexene copolymer were obtained having the characteristics stated in Table 2.

Example 24: Copolymerisation of Ethylene and 1-hexene with Catalyst C6

The same procedures as previously described in Example 19 were used, with the difference that 28.27 mg of catalyst C6, obtained in accordance with Example 6 (19.42 µmol Ti) as a suspension in approx. 10 ml of n-decane, and 1 ml of a 1 M solution of TIBA (molar Al/Ti ratio=51) were respectively introduced into the autoclave. On completion, 107 g of ethylene/1-hexene copolymer were obtained having the characteristics stated in Table 2.

TABLE 2

Copolymerisation of ethylene/1-hexene with bimetallic Ti/Zr catalysts supported on MgCl$_2$; initial temperature 190° C.; cocatalyst TIBA; P$_{total}$ = 15 bar.

| Example | Cat. | Ti (mg) | Al$_{TIBA}$/Ti | 1-Hexene (ml) | Yield (g) | Activity (kg/g$_{Ti}$) | MFI 2.16 g/10' | Density g/cm$^3$ |
|---|---|---|---|---|---|---|---|---|
| 22 | C4 Mg/Ti/Zr | 0.63 | 76 | 75 | 94 | 150 | 0.17 | 0.925 |
| 23 | C5 Mg/Ti/Zr | 0.66 | 73 | 75 | 73 | 110 | 0.09 | 0.924 |
| 24 | C6 Mg/Ti/Zr | 0.93 | 51 | 75 | 107 | 115 | 0.33 | 0.929 |

Example 25: Copolymerisation of Ethylene and 1-hexene with Catalyst C7

The same procedures as previously described in Example 19 were used, with the difference that 15.79 mg of catalyst C7, obtained in accordance with Example 7 (10.65 μmol Ti) as a suspension in approx. 10 ml of n-decane, and 1 ml of a 1 M solution of TIBA (molar Al/Ti ratio=94) were respectively introduced into the autoclave. On completion, 64 g of ethylene/1-hexene copolymer were obtained having the characteristics stated in Table 3.

Example 26: Copolymerisation of Ethylene and 1-hexene with Catalyst C8

The same procedures as previously described in Example 19 were used, with the difference that 22.61 mg of catalyst C8, obtained in accordance with Example 8 (18.86 μmol Ti) as a suspension in approx. 10 ml of n-decane, and 1 ml of a 1 M solution of TIBA (molar Al/Ti ratio=92) were respectively introduced into the autoclave. On completion, 59 g of ethylene/1-hexene copolymer were obtained having the characteristics stated in Table 3.

Example 27: Copolymerisation of Ethylene and 1-hexene with Catalyst C9

The same procedures as previously described in Example 19 were used, with the difference that 25.84 mg of catalyst C9, obtained in accordance with Example 9 (17.75 μmol Ti) as a suspension in approx. 10 ml of n-decane, and 1 ml of a 1 M solution of TIBA (molar Al/Ti ratio=56) were respectively introduced into the autoclave. On completion, 114 g of ethylene/1-hexene copolymer were obtained having the characteristics stated in Table 3.

Example 28: Copolymerisation of Ethylene and 1-hexene with Catalyst C10

The same procedures as previously described in Example 19 were used, with the difference that 17.50 mg of catalyst 010, obtained in accordance with Example 10 (11.69 μmol Ti) as a suspension in approx. 10 ml of n-decane, and 1 ml of a 1 M solution of TIBA (molar Al/Ti ratio=86) were respectively introduced into the autoclave. On completion, 184 g of ethylene/1-hexene copolymer were obtained having the characteristics stated in Table 4.

Example 29: Copolymerisation of Ethylene and 1-hexene with Catalyst C11

The same procedures as previously described in Example 19 were used, with the difference that 17.79 mg of catalyst C11, obtained in accordance with Example 11 (11.07 μmol Ti) as a suspension in approx. 10 ml of n-decane, and 1 ml of a 1 M solution of TIBA (molar Al/Ti ratio=90) were respectively introduced into the autoclave. On completion, 149 g of ethylene/1-hexene copolymer were obtained having the characteristics stated in Table 4.

Example 30: Copolymerisation of Ethylene and 1-hexene with Catalyst C12

The same procedures as previously described in Example 19 were used, with the difference that 20 mg of catalyst C12, obtained in accordance with Example 12 (11.42 μmol Ti) as a suspension in approx. 10 ml of n-decane, and 1 ml of a 1 M solution of TIBA (molar Al/Ti ratio=88) were respectively introduced into the autoclave. On completion, 124 g of ethylene/1-hexene copolymer were obtained having the characteristics stated in Table 4.

TABLE 3

Copolymerisation of ethylene/1-hexene with bimetallic Ti/Hf catalysts supported on MgCl$_2$; initial temperature 190° C.; cocatalyst TIBA; P$_{total}$ = 15 bar.

| Example | Cat. | Ti (mg) | Al$_{TIBA}$/Ti | 1-Hexene (ml) | Yield (g) | Activity (kg/g$_{Ti}$) | MFI 2.16 g/10' | Density g/cm$^3$ |
|---|---|---|---|---|---|---|---|---|
| 25 | C7 Mg/Ti/Hf | 0.51 | 94 | 75 | 64 | 126 | 0.27 | 0.928 |
| 26 | C8 Mg/Ti/Hf | 0.52 | 92 | 75 | 59 | 114 | 0.19 | 0.926 |
| 27 | C9 Mg/Ti/Hf | 0.85 | 56 | 75 | 114 | 134 | 0.43 | 0.927 |

Example 31: Copolymerisation of Ethylene and 1-hexene with Catalyst C13

The same procedures as previously described in Example 19 were used, with the difference that 13.46 mg of catalyst C13, obtained in accordance with Example 13 (8.77 µmol Ti) as a suspension in approx. 10 ml of n-decane, and 1 ml of a 1 M solution of TIBA (molar Al/Ti ratio=114) were respectively introduced into the autoclave. On completion, 85 g of ethylene/1-hexene copolymer were obtained having the characteristics stated in Table 4.

Example 32: Copolymerisation of Ethylene and 1-hexene with Catalyst C14

The same procedures as previously described in Example 19 were used, with the difference that 14.95 mg of catalyst C14, obtained in accordance with Example 14 (9.40 µmol Ti) as a suspension in approx. 10 ml of n-decane, and 1 ml of a 1 M solution of TIBA (molar Al/Ti ratio=106) were respectively introduced into the autoclave. On completion, 99 g of ethylene/1-hexene copolymer were obtained having the characteristics stated in Table 4.

Example 34: Copolymerisation of Ethylene and 1-hexene with Catalyst C16

The same procedures as previously described in Example 19 were used, with the difference that 20.00 mg of catalyst C16 prepared in accordance with Example 16 (16 µmol Ti) as a suspension in approx. 15 ml of n-decane, and 1 ml of a 1 M solution of TIBA (1 mmol) in n-decane as cocatalyst (molar Al/Ti ratio=58.8) were introduced into the autoclave. On completion, 87 g of ethylene/1-hexene copolymer were obtained having the characteristics stated in Table 5.

Example 35: Copolymerisation of Ethylene and 1-hexene with Catalyst C17

The same procedures as previously described in Example 19 were used, with the difference that 17.75 mg of catalyst C17 prepared in accordance with Example 17 (12 µmol Ti) as a suspension in approx. 10 ml of n-decane, and 1 ml of a 1 M solution of TIBA (molar Al/Ti ratio=83.3) were respectively introduced into the autoclave. On completion, 65 g of ethylene/1-hexene copolymer were obtained having the characteristics stated in Table 5.

TABLE 4

Copolymerisation of ethylene/1-hexene with bimetallic Ti/Hf and Ti/Zr catalysts supported on $MgCl_2$; initial temperature 190° C.; cocatalyst TIBA; $P_{total}$ = 15 bar.

| Example | Cat. | Ti (mg) | $Al_{TIBA}$/Ti | 1-Hexene (ml) | Yield (g) | Activity ($kg/g_{Ti}$) | MFI 2.16 g/10' | Density $g/cm^3$ |
|---|---|---|---|---|---|---|---|---|
| 28 | C10 Mg/Ti | 0.56 | 86 | 75 | 184 | 329 | 0.87 | 0.925 |
| 29 | C11 Mg/Ti/Zr | 0.53 | 90 | 75 | 149 | 281 | 0.07 | 0.924 |
| 30 | C12 Mg/Ti/Hf | 0.55 | 88 | 75 | 124 | 225 | 0.13 | 0.927 |
| 31 | C13 Mg/Ti/Zr | 0.42 | 114 | 75 | 85 | 203 | 0.10 | 0.925 |
| 32 | C14 Mg/Ti/Zr | 0.45 | 106 | 75 | 99 | 220 | 0.08 | 0.924 |

Example 33: Copolymerisation of Ethylene and 1-hexene with Catalyst C15

The same procedures as previously described in Example 19 were used, with the difference that 24.31 mg of catalyst C15 prepared in accordance with Example 15 (16 µmol Ti) as a suspension in approx. 10 ml of n-decane, and 1 ml of a 1 M solution of TIBA (1 mmol) in n-decane as cocatalyst (molar Al/Ti ratio=58.8) were introduced into the autoclave. On completion, 92 g of ethylene/1-hexene copolymer were obtained and characterised by measuring the content of 1-hexene, the melt flow index and density. The results are shown in Table 5 below.

Example 36: Copolymerisation of Ethylene and 1-hexene with Catalyst C18

The same procedures as previously described in Example 19 were used, with the difference that 22.62 mg of catalyst C18 prepared in accordance with Example 18 (12 µmol Ti) as a suspension in approx. 10 ml of n-decane, and 1 ml of a 1 M solution of TIBA (molar Al/Ti ratio=83.36) were respectively introduced into the autoclave. On completion, 69 g of ethylene/1-hexene copolymer were obtained having the characteristics stated in Table 5.

TABLE 5

Copolymerisation of ethylene/1-hexene with catalysts supported on $MgCl_2$; initial temperature 190° C.; cocatalyst TIBA; $P_{total}$ = 15 bar.

| Example | Cat. | Ti (mg) | $Al_{TIBA}$/Ti | 1-Hexene (ml) | Yield (g) | Activity ($kg/g_{Ti}$) | MFI 2.16 g/10' | Density $g/cm^3$ |
|---|---|---|---|---|---|---|---|---|
| 33 | C15 Mg/Ti | 0.41 | 58.8 | 75 | 92 | 224 | 0.85 | 0.929 |
| 34 | C16 Mg/Ti/Zr | 0.64 | 58.8 | 75 | 87 | 136 | 0.12 | 0.926 |
| 35 | C17 Mg/Ti/Hf | 0.61 | 83.3 | 75 | 65 | 107 | 0.20 | 0.927 |
| 36 | C18 Mg/Ti/Hf | 0.75 | 83.4 | 75 | 69 | 92 | 0.18 | 0.925 |

The invention claimed is:

1. Process for the preparation of a solid catalyst for the (co)polymerisation of α-olefins, comprising titanium, magnesium, aluminum, chlorine and, optionally, at least one metal M selected from hafnium and zirconium, comprising the following steps in succession:
   (i) preparing a first mixture by mixing and heating to a temperature from 40 to 200° C., for at least one minute, a hydrocarbon liquid medium, at least one magnesium chloride, at least one titanium compound, at least one carboxylic acid R—COOH, wherein R is an organic group having from 2 to 30 carbon atoms and, optionally, at least one compound of said metal M, in an amount such as to comply with the following ranges of atomic or molar ratios:

M/Ti=0.0-5.0; Mg/Ti=3.0-15.0; R—COOH/(Mg+M)=1.5-8

(ii) adding to the first mixture obtained in step (i), at a temperature between 10 and 70° C., a chlorinating agent which is soluble in said hydrocarbon liquid medium, in a sufficient quantity to cause at least 70% of the magnesium and any of said metal M present in the solution to precipitate in the form of solid chlorides, so as to obtain a second mixture comprising a liquid phase and a solid phase,
   wherein said chlorinating agent is selected from soluble complexes of aluminium trichloride having one of the following general formulae (II) or (III):

AlCl3.OR"R"'     (II)

AlCl3.Ar.HX     (III)

wherein: R" and R"' each independently represent an organic group having from 1 to 30 carbon atoms,
   Ar represents an optionally substituted aromatic hydrocarbon compound having from 6 to 20 carbon atoms,
   X represents a halogen atom,
   (iii) adding to the second mixture obtained in the previous step (ii) an organometallic compound of a metal M' having the following formula (IV):

M'R""nCl(p-n)     (IV)

wherein:
   M' is trivalent aluminum;
   R"" is a linear or branched alkyl radical containing from 1 to 20 carbon atoms,
   "n" is a decimal number having a value between 0.5 and p, where p is the valence of M';
   and reacting until at least 70% of the titanium present has precipitated in the form of a solid compound to obtain said solid catalyst.

2. Process according to claim 1, wherein, in said step (i), the total concentration of metals is between 0.1 and 1.0 mol/l.

3. Process according to claim 1, wherein, in said step (i), the compounds of Ti and M are selected from the chlorides and alcoholates of said metals.

4. Process according to claim 1, wherein, in step (i), the molar ratio M/Ti is between 0.2 and 5.0.

5. Process according to claim 1, wherein said step (i) is carried out in such a manner that there are no significant outward losses of material.

6. Process according to claim 1, wherein said step (ii) is carried out while maintaining a temperature between 30 and 50° C. during addition of said chlorinating agent to said first mixture, and then heating said second mixture to a temperature between 50 and 70° C.

7. Process according to claim 1 wherein, in said step (iii), addition of the compound of formula (IV) to said second mixture is carried out at a temperature of 20 to 60° C., for a time of 10 minutes to 4 hours, and then a resultant suspension is heated and maintained at a temperature of 60 to 130° C. for a time of 5 to 180 minutes.

8. Process according to claim 1 wherein, in said step (iii), the amount in moles of the compound of formula (IV) is between 1.5 and 20 times the moles of titanium present in said second mixture.

9. Process according to claim 1 wherein, at the end of step (iii), said solid catalyst is separated from reaction liquid and is obtained in the form of a suspension with concentrations between 150 and 500 g/l, in an aliphatic hydrocarbon having from 5 to 14 carbon atoms.

10. Process according to claim 1 wherein, at the end of step (iii), said solid catalyst is obtained in the form of a concentrated mixture or suspension comprising up to 80% of reaction liquid.

* * * * *